(12) United States Patent
Lah

(10) Patent No.: US 7,578,907 B2
(45) Date of Patent: Aug. 25, 2009

(54) VALVE SYSTEM FOR UNHEADING A COKE DRUM

(75) Inventor: Ruben F. Lah, West Jordan, UT (US)

(73) Assignee: Curtiss-Wright Flow Control Corporation, Falls Church, VA (US)

( * ) Notice: Subject to any disclaimer, the term of this patent is extended or adjusted under 35 U.S.C. 154(b) by 410 days.

(21) Appl. No.: 11/396,982

(22) Filed: Apr. 3, 2006

(65) Prior Publication Data

US 2007/0084714 A1    Apr. 19, 2007

(51) Int. Cl.
*C10B 1/00* (2006.01)
(52) U.S. Cl. .................. 202/242; 202/239; 202/244; 202/245
(58) Field of Classification Search .................. 202/217, 202/221, 222, 239, 242, 244, 245
See application file for complete search history.

(56) References Cited

U.S. PATENT DOCUMENTS

| | | |
|---|---|---|
| 900,206 A | 10/1908 | Reed |
| 2,245,554 A | 6/1941 | Court |
| 2,317,566 A | 4/1943 | Utterback |
| 2,403,608 A * | 7/1946 | Noll et al. .................. 208/165 |
| 2,717,865 A | 9/1955 | Kimberlin, Jr., et al. |
| 2,761,160 A | 9/1956 | Manning |
| 3,379,623 A | 4/1968 | Forsyth |
| 3,617,480 A | 11/1971 | Keel |
| 3,716,310 A | 2/1973 | Guenther |
| 3,837,356 A | 9/1974 | Selep et al. |
| 3,852,047 A | 12/1974 | Schlinger et al. |
| 4,125,438 A | 11/1978 | Kelly et al. |
| 4,253,487 A | 3/1981 | Worley et al. |
| 4,275,842 A | 6/1981 | Purton et al. |
| 4,492,103 A | 1/1985 | Naumann |

(Continued)

OTHER PUBLICATIONS

Z&J Technologies, Reply Memorandum in support of Motion for Summary Judgment of Noninfringement of U.S. Patent No. 6,565,714 (Jul. 2, 2007).

(Continued)

*Primary Examiner*—N. Bhat
(74) *Attorney, Agent, or Firm*—Kirton & McConkie; Michael F. Krieger

(57) ABSTRACT

The present invention features a coke drum de-heading system that provides unique advantages over prior art de-heading systems, namely the de-heading of a coke drum without having to physically remove the head units. This is essentially accomplished using one of a variety of specially designed de-header valves that may be removably coupled to a coke drum much the same way a conventional head or flange unit would be attached. The de-header valve is equipped with, among other things, a valve closure and means for supporting a valve closure capable of forming a continuous contact seal during the coke manufacturing process. The means for supporting a de-header valve typically comprises a seat support system comprising a variety of configurational designs. Actuation of the valve closure functions to open and close the de-header valve, wherein in a closed position, the de-header valve and coke drum are prepared to receive the petroleum byproduct feed from the refinery process used to manufacture coke. Once the drum is full, the de-header valve is again actuated (opened), wherein the coke that has accumulated on the blind is sheared by the seat support system, thus effectively de-heading the coke drum and facilitating the decoking process.

12 Claims, 12 Drawing Sheets

U.S. PATENT DOCUMENTS

| | | | |
|---|---|---|---|
| 4,531,539 A | | 7/1985 | Jandrasi et al. |
| 4,626,320 A | | 12/1986 | Alworth et al. |
| 4,666,585 A | | 5/1987 | Figgins et al. |
| 4,726,109 A | | 2/1988 | Malsbury et al. |
| 4,738,399 A | | 4/1988 | Adams |
| 4,771,805 A | * | 9/1988 | Maa ........................ 137/454.6 |
| 4,797,197 A | | 1/1989 | Mallari |
| 4,929,339 A | | 5/1990 | Elliott, Jr. et al. |
| 4,959,126 A | | 9/1990 | Tong et al. |
| 4,960,358 A | | 10/1990 | DiGiacomo et al. |
| 5,024,730 A | | 6/1991 | Colvert |
| 5,035,221 A | | 7/1991 | Martin |
| 5,041,207 A | | 8/1991 | Harrington et al. |
| 5,048,876 A | | 9/1991 | Wallskog |
| 5,076,893 A | | 12/1991 | Tong et al. |
| 5,116,022 A | | 5/1992 | Genreith et al. |
| 5,221,019 A | | 6/1993 | Pechacek et al. |
| 5,228,825 A | | 7/1993 | Fruchtbaum et al. |
| 5,417,811 A | | 5/1995 | Malsbury |
| H1442 H | | 6/1995 | Edgerton et al. |
| 5,464,035 A | | 11/1995 | Heinecke |
| 5,581,864 A | | 12/1996 | Rabet |
| 5,785,843 A | | 7/1998 | Antalffy et al. |
| 5,794,729 A | | 8/1998 | Van Meter et al. |
| 5,816,787 A | | 10/1998 | Brinkerohoff et al. |
| 5,876,568 A | | 3/1999 | Kindersley |
| 5,927,684 A | * | 7/1999 | Marx et al. .................. 251/203 |
| 5,947,674 A | | 9/1999 | Malsbury et al. |
| 6,039,844 A | | 3/2000 | Malik |
| 6,066,237 A | | 5/2000 | Kindersley |
| 6,113,745 A | | 9/2000 | Maitland et al. |
| 6,117,308 A | | 9/2000 | Ganji |
| 6,223,925 B1 | | 5/2001 | Malsbury et al. |
| 6,228,225 B1 | | 5/2001 | Meher-Homji |
| 6,254,733 B1 | | 7/2001 | Lu et al. |
| 6,264,797 B1 | | 7/2001 | Schroeder et al. |
| 6,264,829 B1 | | 7/2001 | Antalffy et al. |
| 6,565,714 B2 | | 5/2003 | Lah |
| 6,644,567 B1 | | 11/2003 | Adams et al. |
| 6,660,131 B2 | | 12/2003 | Lah |
| 6,935,371 B2 | | 8/2005 | Stares |
| 2002/0157897 A1 | | 10/2002 | Hofmann et al. |
| 2002/0166862 A1 | | 11/2002 | Malsbury et al. |
| 2002/0170814 A1 | | 11/2002 | Lah |
| 2003/0047153 A1 | | 3/2003 | Kubel et al. |
| 2003/0089589 A1 | | 5/2003 | Malsbury |
| 2003/0127314 A1 | | 7/2003 | Bell et al. |
| 2003/0159737 A1 | | 8/2003 | Stares |
| 2003/0185718 A1 | | 10/2003 | Sellakumar |
| 2004/0118746 A1 | | 6/2004 | Wilborn et al. |
| 2004/0238662 A1 | | 12/2004 | Paul |

OTHER PUBLICATIONS

Z&J Technologies, Declaration of Amy C Christensen is support of reply memorandum in support of motion for summary judgment of noninfringement of U.S> Patent No. 6,565,714 (Jul. 2, 2007).

U.S. District Court, Central District of California, Minutes of in Chambers Order held before Judge S. James Otero regarding motion for Summary Judgment, hearing date is vacated. (Jul. 3, 2007).

Z&J Technologies, Memorandum in Opposition to Curtiss-Wright, Motion for Continuance (Jul. 3, 2007).

Curtiss-Wright Flow Control Corporation, Denied Request for 7 Day Extension of Discovery Period, 21 Day Continue of Summary Judgement (Jul. 5, 2007).

U.S. District Court, Central District of California, Stipulation and Order to Extend Date to File Pre Trial Documents and Motions in Limine, Judge S. James Otero (Jul. 23, 2007).

U.S. District Court, Central District of California, Order Denying Z&J Motion, (Jul. 24, 2007).

Z&J Technologies Notice of Motion and Motion in Limine to Exclude Testimony (Jul. 24, 2007).

Z&J Points and Authorities in Support of Motion in Limine (Jul. 24, 2007).

Z&J Declaration of Amy C. Christensen in support of Motion in Limine (Jul. 24, 2007).

Curtiss-Wright Flow Control Corporation Motion in Limine to Exclude Evidence Relating to the Pending Reexamination of US Patent No. 6,964,727 (Jul. 24, 2007).

Curtiss-Wright Flow Control Corporation, Declaration of R. Scott Feldmann, (Jul. 24, 2007).

Curtiss-Wright Flow Control Corporation Motion in Limine to Preclude Norgert Marx from Testifying (Jul. 24, 2007).

Curtiss-Wright Flow Control Corporation Motion in Limine to Preclude Evidence or Argument (Jul. 24, 2007).

Curtiss-Wright Flow Control Corporation Declaration of R. Scott Feldmann in Support of Motion in Limine to Preclude Norgert Marx (Jul. 24, 2007).

Z&J Technologies Opposition to Motion in Limine to Preclude Evidence or Argument (Aug. 2, 2007).

Z&J Technologies Declaration of Amy C. Christensen (Aug. 2, 2007).

Z&J Technologies Opposition to Motion in Limine to Exclude Evidence Relating to the Pending Reexamination of US Patent 6,964,727 (Aug. 2, 2007).

Z&J Technologies Memorandom in Response to Plaintiff's Motion in Limine (Aug. 2, 2007).

Z&J Technologies Memorandum of Contensions of Fact and Law (Aug. 5, 2007).

Curtiss-Wright Flow Control Corporation, Joint Exhibit (Aug. 6, 2007).

Curtiss-Wright Flow Control Corporation, Joint Witness List (Aug. 10, 2007).

Curtiss-Wright Flow Control Corporation, Pre Trial Exhibit List (Aug. 13, 2007).

Curtiss-Wright Flow Control Corporation Reply and Support Motion in Limine to Exclude Evidence Relating to the Pending Reexamination of US Patent No. 6,964,727 (Aug. 13, 2007).

Curtiss-Wright Flow Control Corporation, Reply and Support of Motion in Limine to Preclude Evidence or Argument (Aug. 13, 2007).

Curtiss-Wright Flow Control Corporation, Reply and Support of Motion in Limine to Preclude Norgert Marx (Aug. 13, 2007).

Z&J Technologies Reply and Support of Motion in Limine (Aug. 13, 2007).

Z&J Technologies Declaration of Amy C. Christensen (Aug. 13, 2007).

Curtiss-Wright Flow Control Corporation, Deposition Designations (Aug. 13, 2007).

Z&J Technologies Application for Order to Bring Equipment Into Courtroom for Trial (Aug. 16, 2007).

US District Court Central District of California, Minutes (Aug. 17, 2007).

US District Court Central District of California, Order (Aug. 17, 2007).

US District Court Central District of California, Stipulation and Order, Dismissal with Prejudice (Aug. 21, 2007).

Seminar Materials, "3rd Annual Universal Delayed Coking Seminar," held Oct. 26-28, 1998 in Santa Monica, California, 45 pages.

Seminar Materials, "Delayed Coking Process Technology," presented by Refining Process Services, Inc. Apr. 20-22, 1999 in Houston, Texas, 89 pages.

Curtiss-Wright Flow Control Corp., Notice of Lawsuit and Request for Waiver of Service of Summons to Z&J Technologies GMBH., Apr. 20, 2006.

U.S. District Court for the Central Distract of California, Case Reassignment to Judge Otero, Order, Apr. 27, 2006.

U.S. District Court for the Central District of California, Initial Standing Order, Order, Apr. 27, 2006.

Zimmermann & Jansen, Inc., Certification and Notice of Interested Parties, May 9, 2006.

Curtiss-Wright Flow Control Corp. & Zimmermann & Jansen, Inc., Joint Stipulation RE Extension of Time to Respond to Complaint, Court Pleading, May 9, 2006.
Burdman, Neblett, and Supko, Pro Hac Vice Application, Court Pleading, May 15, 2006.
U.S. District Court for the Central District of California, Neblett Order to Appear, Order, May 22, 2006.
U.S. District Court for the Central District of California, Berdman Order to Appear, Order, May 22, 2006.
U.S. District Court for the Central District of California, Supko Order to Appear, Order, May 22, 2006.
Z&J Technologies GMBH, Proof of Waiver of Service, Court Pleading, Jun. 2, 2006.
Arroyo, Blas, Application to Appear, Court Pleading, Jun. 8, 2006.
U.S. District Court for the Central District of California, Notice of Minutes of Scheduling Conference, Order, Jun. 15, 2006.
Curtiss-Wright Flow Control Corp. & Z&J Technologies GMBH & ZImmermann and Jansen, Inc., Stipulation and Order to Continue Scheduling Conference, [Proposed] Order, Jul. 3, 2006.
Z&J Technologies GMBH, Certificate and Notice of Interested Parties, Jul. 19, 2006.
Z&J Technologies GMBH & Zimmermann & Jansen, Inc., Application to File Under Seal Confidential Documents in Support of Their Opposition to Curtiss-Wright's Motion for Preliminary Injunction, Court Pleading, Jul. 20, 2006.
Malik, Jitendra, Application to Appear, Court Pleading, Jul. 26, 2006.
U.S. District Court for the Central District of California, Malik Order to Appear, Order, Jul. 31, 2006.
U.S. District Court for the Central District of California, Joint Rule 26(f) Report, Aug. 4, 2006.
U.S. District Court for the Central District of California, Hearing Date Vacated, Order, Aug. 7, 2006.
U.S. District Court for the Central District of California, Scheduling Conference, Order, Aug. 14, 2006.
U.S. District Court for the Central District of California, Order Denying Curtiss-Wright's Motion for Preliminary Injunction, Order, Sep. 7, 2006.
U.S. District Court for the Central District of California, Stipulated Protective Order, Order, Nov. 21, 2006.
Curtiss-Wright Flow Control Corp., Memorandum in Support of Motion for Summary Judgment on Claim Construction Issues, Court Pleading, Jan. 16, 2007.
Curtiss-Wright Flow Control Corp., Notice of Motion and Motion for Summary Judgment on Claim Construction Issues, Court Pleading, Jan. 16, 2007.
Curtiss-Wright Flow Control Corp., Declaration of Dennis R. Gallagher in Support of Curtiss-Wright's Memorandum in Support of Motion for Summary Judgment on Claim Construction Issues, Court Pleading, Jan. 16, 2007.
Curtiss-Wright Flow Control Corp., Joint Claim Construction Statement in Support of Curtiss-Wright's Motion for Summary Judgment on Claim Construction Issues, Court Pleading, Jan. 16, 2007.
Z&J Technologies GMBH & Zimmermann & Jansen, Declaration of Amy C. Christensen in Support of Z&J Technologies GMBH & Zimmermann & Jansen's Memorandum in Response to Curtiss-Wright's Motion for Summary Judgment on Claim Construction Issues, Court Pleading, Feb. 15, 2007.
Z&J Technologies GMBH & Zimmermann & Jansen, Defendants Memorandum in Response to Curtiss-Wright's Motion for Summary Judgment on Claim Construction Issues, Court Pleading, Feb. 15, 2007.
Curtiss-Wright Flow Control Corp. and Z&J Technologies GMBH & Zimmermann & Jansen, Stipulation to Continue Pretrial Schedule and [Proposed] Order, Court Pleading, Feb. 22, 2007.
Curtiss-Wright Flow Control Corp., Declaration of Dennis R. Gallagher in Support of Curtiss-Wright's Reply Memorandum in support of Curtiss-Wright's Motion for Summary Judgment on Claim Construction Issues, Court Pleading, Feb. 26, 2007.
Curtiss-Wright Flow Control Corp. Reply Memorandum in support of Motion for Summary Judgment on Claim Construction Issues, Court Pleading, Feb. 26, 2007.
Curtiss-Wright Flow Control Corp. and Z&J Technologies GMBH & Zimmermann & Jansen, Revised Stipulation to Continue Pretrial Schedule and [Proposed] Order, Court Pleading, Mar. 5, 2007.
U.S. District Court for the Central District of California, Transcript of Claim Construction Hearing, Transcript, Mar. 19, 2007.
U.S. District Court for the Central District of California, Order RE Curtiss-Wright's Motion for Claim Construction, Order, Apr. 6, 2007.
Curtiss-Wright Flow Control Corp. Curtiss-Wright's Notice of Motion and Motion for Relief from Claim Construction Order, Court Pleading, Apr. 19, 2007.
Curtiss-Wright Flow Control Corp., Declaration of Dennis R. Gallagher in Support of Curtiss-Wright's Motion for Relief from Claim Construction Order, Court Pleading, Apr. 19, 2007.
Curtiss-Wright Flow Control Corp., Memorandum in Support of Curtiss-Wright's Motion for Relief from Claim Construction Order, Court Pleading, Apr. 19, 2007.
U.S. District Court for the Central District of California, Minutes from Hearing RE Curtiss-Wright's Motion for Relief from Claim Construction Order, Minutes, Apr. 23, 2007.
Z&J Technologies GMBH & Zimmermann & Jansen, Defendant's response to Curtiss-Wright's Request for Reconsideration of the Court's Claim Construction Order, Court Pleading, May 7, 2007.
U.S. District Court for the Central District of California, Order Denying Curtiss-Wright's Motion for Relief from Claim Construction Order, Order, May 16, 2007.
Steven W. Sparks, Agreement to be Bound by Protective Order, Court Pleading, May 30, 2007.
Z&J Technologies GMBH & Zimmermann & Jansen, Defendant's Motion for Summary Judgment Of Noninfringement of U.S. Patent No. 6,565,714, Court Pleading, Jun. 4, 2007.
U.S. District Court for the Central District of California, Order Denying Stipulated Supplement to Protective Order, Order, Jun. 6, 2007.
Catalog: Velan Valve Corporation, 1980.
Curtiss-Wright Flow Control Corp., Complaint, Court Pleading, Dec. 16, 2004.
Velan, Inc., Answer, Affirmative Defenses and Counterclaims, Court Pleading, Jan. 10, 2005.
Curtiss-Wright Flow Control Corp., Answer to Defendant Velan Inc.'s Counterclaims, Court Pleading, Feb. 2, 2005.
Curtiss-Wright Flow Control Corp., Motion for a Preliminary Injunction, Court Pleading, Mar. 1, 2005.
Transcript, Deposition of Ruben F. Lah, Transcript, Mar. 29, 2005.
Exhibits, Exhibits from Mar. 29, 2005 Deposition of Ruben F. Lah, Exhibits, Mar. 29, 2005.
Velan, Inc., Opposition to Curtiss-Wright Flow Control Corp.'s Motion for a Preliminary Injunction, Court Pleading, Apr. 1, 2005.
Curtiss-Wright Flow Control Corp., Reply Brief in Support of Its Motion for Preliminary Injunction, Court Pleading, Apr. 8, 2005.
U.S. District Court for the Western District of Texas, Preliminary Injuction Hearing Transcript, Transcript, Apr. 12, 2005.
Velan, Inc., Supplement to Velan Inc.'s Opposition to Curtiss-Wright Flow Control Corp.'s Motion for a Preliminary Injunction, Court Pleading, Apr. 12, 2005.
U.S. District Court for the Western District of Texas, Order RE Motion for Preliminary Injunction, Order, Apr. 15, 2005.
Velan, Inc., Motion to Stay Discovery and Proceedings Pending Appeal, Court Pleading, Apr. 29, 2005.
Curtiss-Wright Flow Control Corp., Opposition to Motion to Stay Discovery and Proceedings Pending Appeal, Court Pleading, May 9, 2005.
Velan, Inc., Appeal of the Order of the Magistrate Judge Denying Velan's Motion to Stay Discovery and Proceedings Pending Appeal, Court Pleading, Jun. 2, 2005.
Velan, Inc., Brief of Defendant-Appellant Velan, Inc., Court Pleading, Jun. 2, 2005.
Curtiss-Wright Flow Control Corp., Opposition to Velan Inc.'s Appeal of the Order of the Magistrate Judge Denying Velan's Motion to Stay Discovery . . . , Court Pleading, Jun. 7, 2005.
Curtiss-Wright Flow Control Corp., [Corrected] Brief of Plaintiff-Appellee Curtiss-Wright Flow Control Corp., Court Pleading, Jul. 13, 2005.

Velan, Inc., Reply Brief of Defendant-Appellant Velan, Inc., Court Pleading, Jul. 15, 2005.
Curtiss-Wright Flow Control Corp. & Velan, Inc., Joint Appendix on Appeal to the Federal Circuit, Court Pleading, Jul. 19, 2005.
Curtiss-Wright Flow Control Corp. & Velan, Inc., Joint Claim Construction and Prehearing Statement, Court Pleading, Aug. 10, 2005.
Curtiss-Wright Flow Control Corp., Memorandum on Claim Construction Issues, Court Pleading, Sep. 2, 2005.
Velan, Inc., Brief on Claim Construction, Court Pleading, Oct. 3, 2005.
Curtiss-Wright Flow Control Corp., Reply Memorandum on Claim Construction Issues, Court Pleading, Oct. 18, 2005.
Curtiss-Wright Flow Control Corp., First Amended Complaint, Court Pleading, Dec. 7, 2005.
Velan, Inc., Answer, Affirmative Defenses and Counterclaims to Curtiss-Wright Flow Control Corp.'s First Amended Complaint, Court Pleading, Dec. 27, 2005.
Curtiss-Wright Flow Control Corp., Answer to Velan's Counterclaim to the First Amended Complaint, Court Pleading, Dec. 30, 2005.
Curtiss-Wright Flow Control Corp. & Velan, Inc., Amended Joint Claim Construction Statement, Court Pleading, Jan. 12, 2006.
Transcript, Transcript of Claim Construction Hearing Before U.S. Magistrate Judge John W. Primomo RE Claim Construction, Transcript, Jan. 17, 2006.
U.S. Court of Appeals for the Federal Circuit, Decision on Appeal of the Preliminary Injunction Order of Apr. 15, 2005, Decision on Appeal, Feb. 15, 2006.
Curtiss-Wright Flow Control Corp., Renewed Motion for a Preliminary injunction, Court Pleading, Feb. 21, 2006.
Velan, Inc., Opposition to Curtiss-Wright's Renewed Motion for a Preliminary Injunction, Court Pleading, Mar. 10, 2006.
Velan, Inc., Supplemental Brief on Claim Construction Addressing the Impact of the Federal Circuit Opinion, Court Pleading, Mar. 15, 2006.
Velan, Inc., Motion for Partial Summary Judgment of Non-Infringement of U.S. 6,565,714 and 6,660,131, Court Pleading, Mar. 15, 2006.
Curtiss-Wright Flow Control Corp., Brief on the Impact of the Federal Circuit's Feb. 15, 2006 Decision, Court Pleading, Mar. 16, 2006.
Curtiss-Wright Flow Control Corp., Reply Brief In Support of Curtiss-Wright's Renewed Motion for a Preliminary Injunction, Court Pleading, Mar. 21, 2006.
Curtiss-Wright Flow Control Corp., Opposition to Velan's Motion for Partial Summary Judgment of Non-Infringement, Court Pleading, Mar. 28, 2006.
Curtiss-Wright Flow Control Corp., Cross-Motion for Partial Summary Judgment of Infringement, Court Pleading, Mar. 28, 2006.
Velan, Inc., Federal Rule 56(f) Opposition to Curtiss-Wright's Motion for Partial Summary Judgment of Infringement, Court Pleading, Apr. 10, 2006.
Velan, Inc., Reply in Support of Its Motion for Partial Summary Judgment of Non-Infringement of U.S. Patent Nos. 6,565,714 and 6,660,131 Court Pleading, Apr. 10, 2006.
Curtiss-Wright Flow Control Corp., Reply in Support of its Cross-Motion for Partial Summary Judgment of Infringement, Court Pleading, Apr. 24, 2006.
Transcript, Deposition of Michael F. Krieger, Transcript, May 18, 2006.
Exhibits, Exhibits from May 18, 2006 Deposition of Michael F. Krieger, Exhibits, May 18, 2006.
Transcript, Deposition of Ruben F. Lah, Transcript, May 19, 2006.
Exhibits, Exhibits from May 19, 2006 Deposition of Ruben F. Lah, Exhibits, May 19, 2006.
Velan, Inc., Sur-Reply to Curtiss-Wright's Renewed Motion for a Preliminary Injunction, Court Pleading, Jun. 13, 2006.
U.S. District Court for the Western District of Texas, Memorandum and Recommendation RE Claim Construction, Order, Jun. 19, 2006.
U.S. District Court for the Western District of Texas, Clarification Order RE Claim Construction, Order, Jun. 23, 2006.
Velan, Inc., Objections to the Magistrate Judge's Memorandum and Recommendation on Claim Construction and Clarification Order, Court Pleading, Jul. 3, 2006.
Curtiss-Wright Flow Control Corp., Objections to Memorandum and Recommendation on Claim Construction Issues, Court Pleading, Jul. 3, 2006.
Velan, Inc., Response to Curtiss-Wright's Objections to Memorandum and Recommendation on Claim Construction Issues, Court Pleading, Jul. 18, 2006.
Curtiss-Wright Flow Control Corp., Response to Velan, Inc.'s Objections to the Magistrate Judge's Memorandum and Recommendation on Claim . . . , Court Pleading, Jul. 18, 2006.
U.S. District Court for the Western District of Texas, Memorandum and Recommendation RE Renewed Motion for Preliminary Injunction, Order, Aug. 10, 2006.
U.S. District Court for the Western District of Texas, Memorandum and Recommendation RE Motion for Partial Summary Judgment of Infringement, Order, Aug. 10, 2006.
U.S. District Court for the Western District of Texas, Memorandum and Recommendation RE Motion for Partial Summary Judgment of Non-Infringement, Order, Aug. 10, 2006.
U.S. District Court for the Western District of Texas, Stipulation and Order of Dismissal, Order, Aug. 16, 2006.
Z&J Technologies GMBH, Innovative Z&J Coker Isolation and Deheading Valves, PowerPoint Presentation, Mar. 31, 2004.
Curtiss-Wright Flow Control Corp., Complaint for Patent Infringement, Court Pleading, Apr. 19, 2006.
Zimmermann & Jansen, Inc., Answer to Complaint, Court Pleading, Jun. 9, 2006.
Curtis-Wright Flow Control Corp., Motion for Preliminary Injuction, Court Pleading, Jun. 12, 2006.
Transcript, Deposition of Michael F. Krieger, Transcript, Jun. 20, 2006.
Exhibits, Exhibits from Jun. 20, 2006 Deposition of Michael F. Krieger, Exhibits, Jun. 20, 2006.
Transcript, Deposition of Ruben F. Lah, Transcript, Jun. 21, 2006.
Exhibits, Exhibits from Jun. 21, 2006 Deposition of Ruben F. Lah, Exhibits, Jun. 21, 2006.
Z&J Technologies GMBH, Answer to Complaint, Court Pleading, Jul. 19, 2006.
Z&J Technologies GMBH & Zimmermann & Jansen, Inc., Memorandum in Opposition to Plaintiff's Motion for Preliminary Injunction, Court Pleading, Jul. 20, 2006.
Curtiss-Wright Flow Control Corp., Reply Brief in Support of Motion for Preliminary Injunction, Court Pleading, Aug. 4, 2006.
Zimmermann & Jansen, Through Conduit Type Valve Single Disc Design: Metal-to-Metal Seating, Brochure, Undated.
Zimmermann & Jansen, Through Conduit Type Valve Double Disc Design: Metal-to-Metal Seating, Brochure, Undated.

* cited by examiner

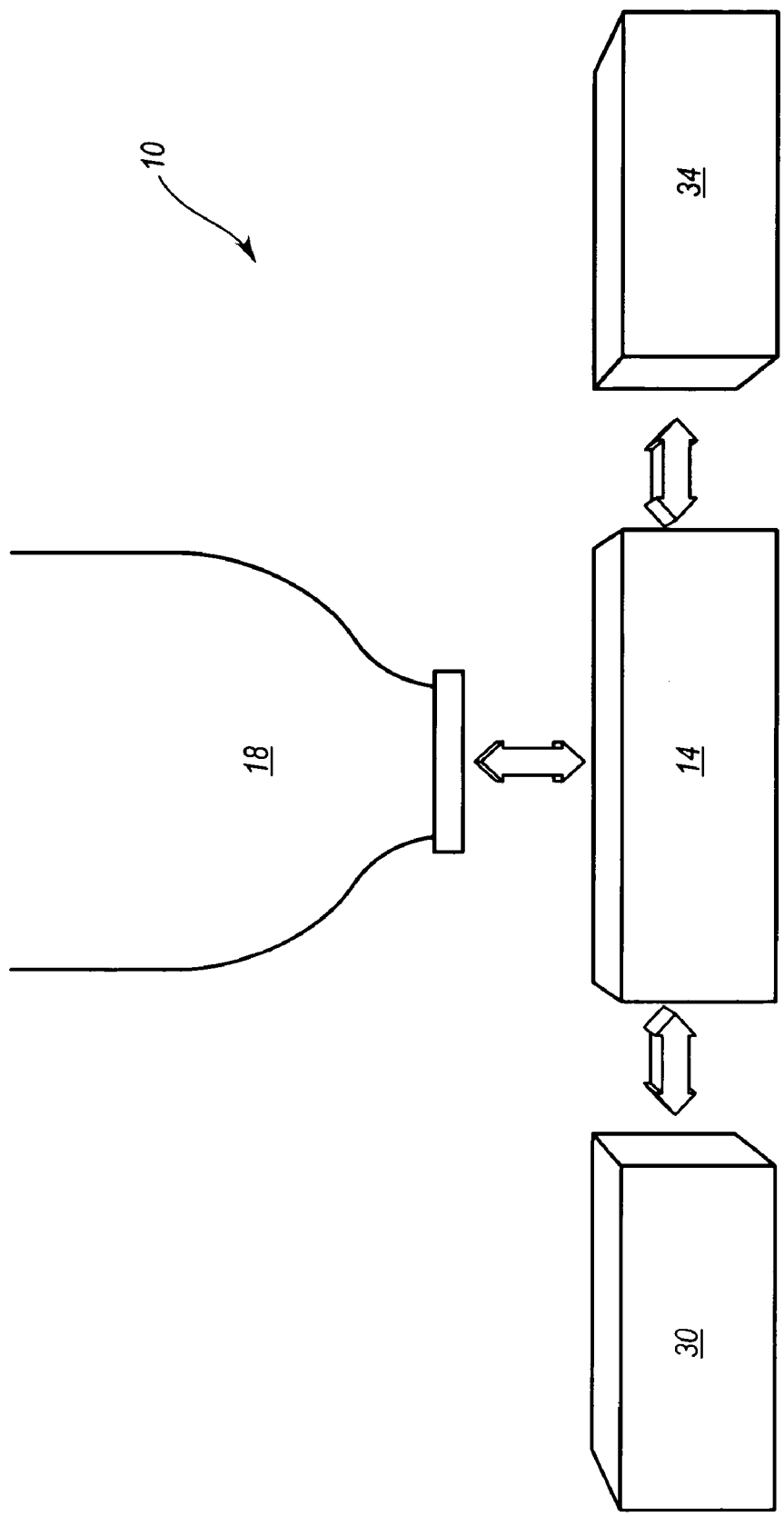

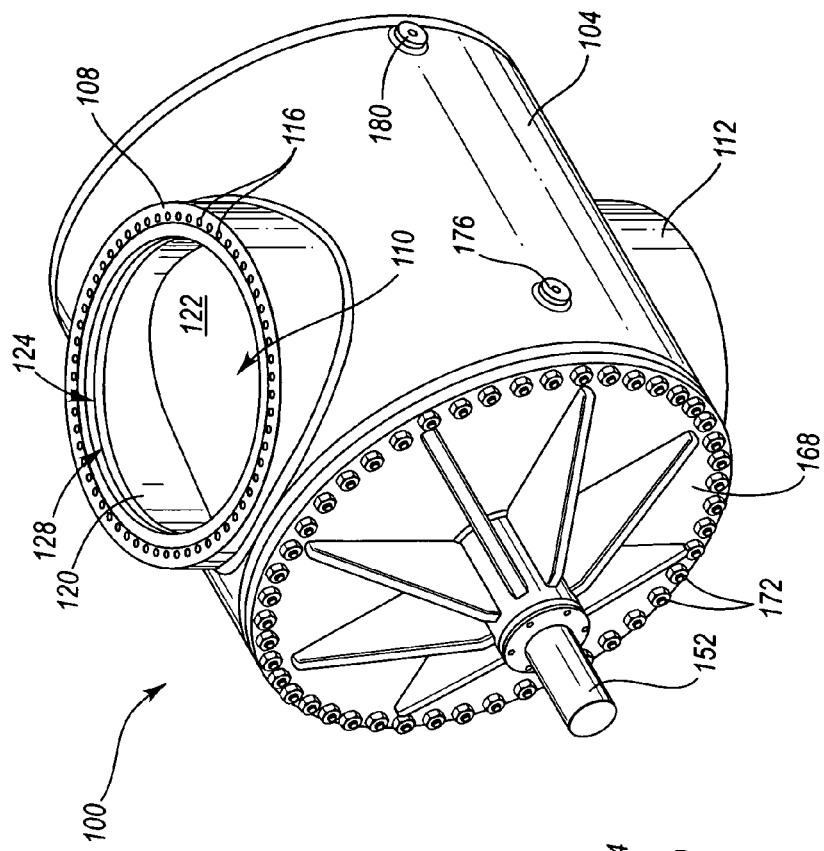
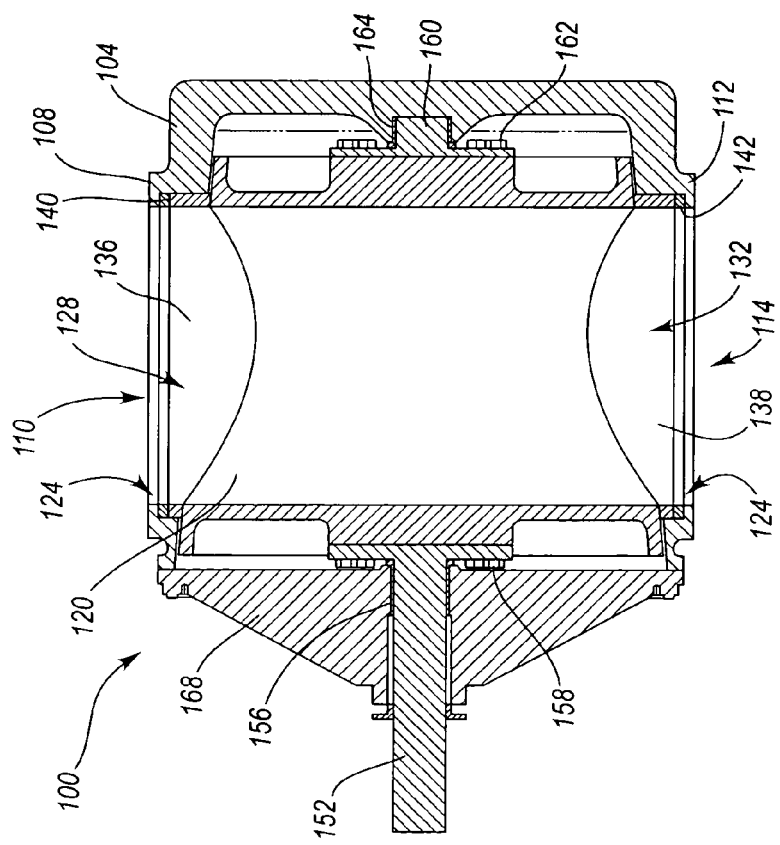
Fig. 3A
Fig. 3B

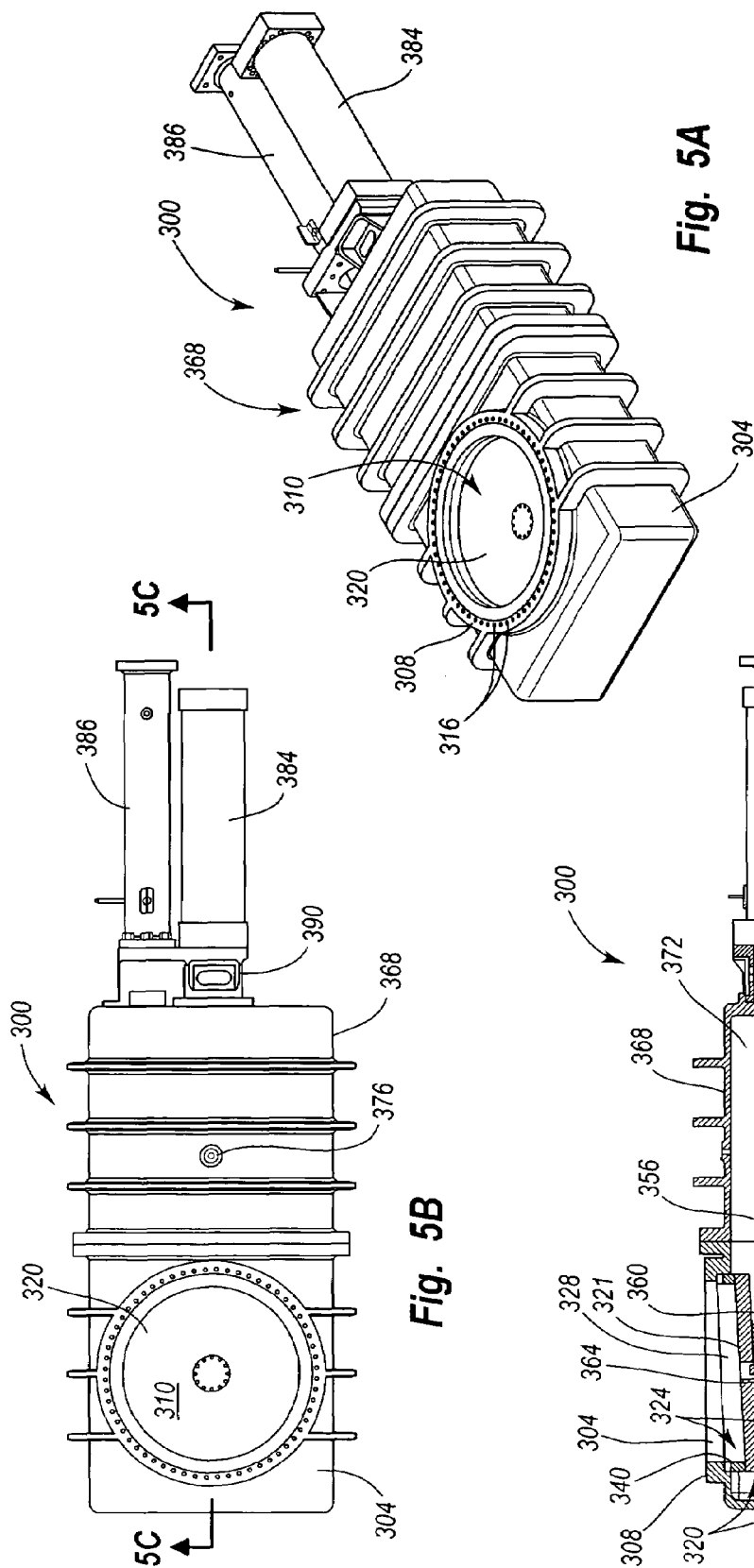

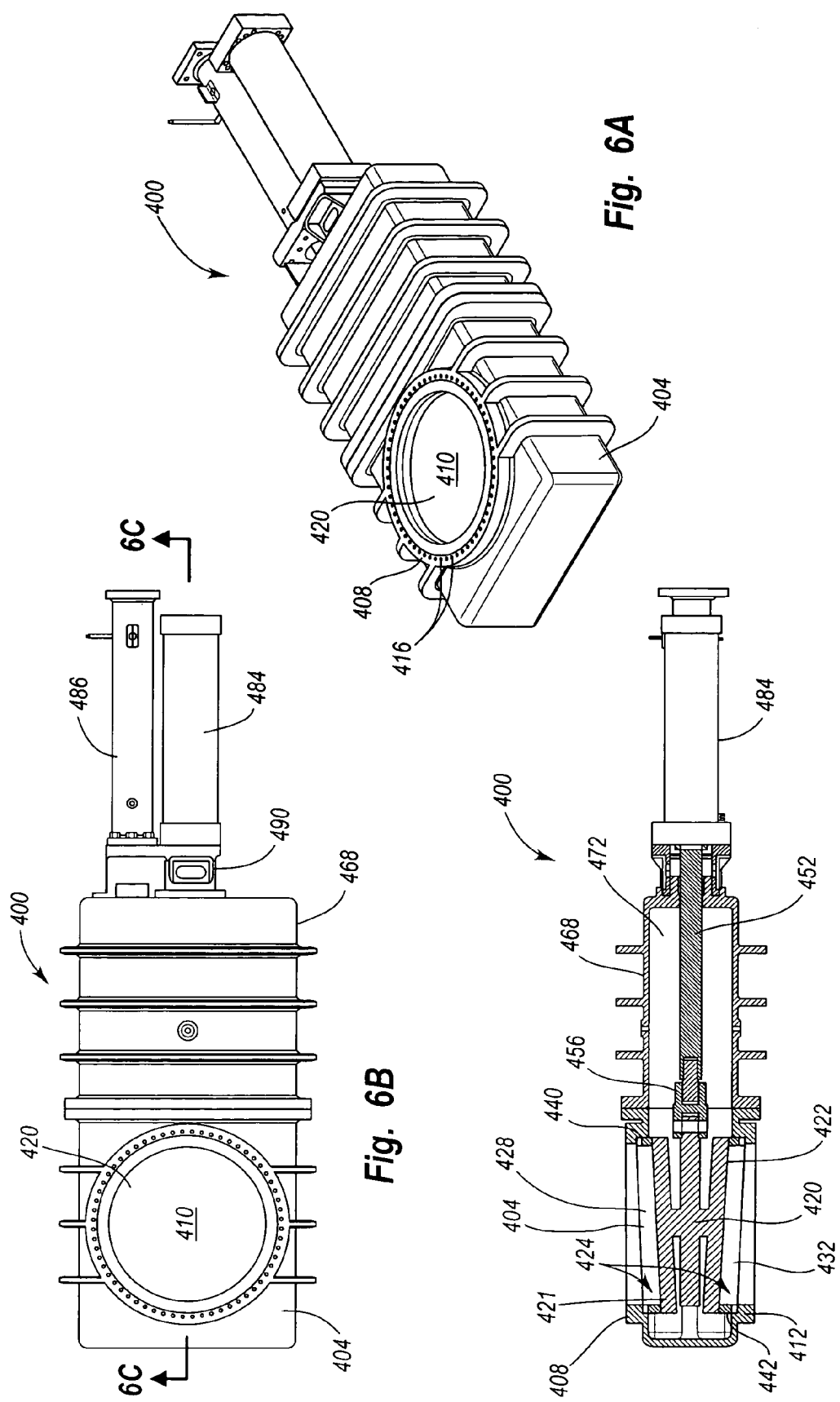

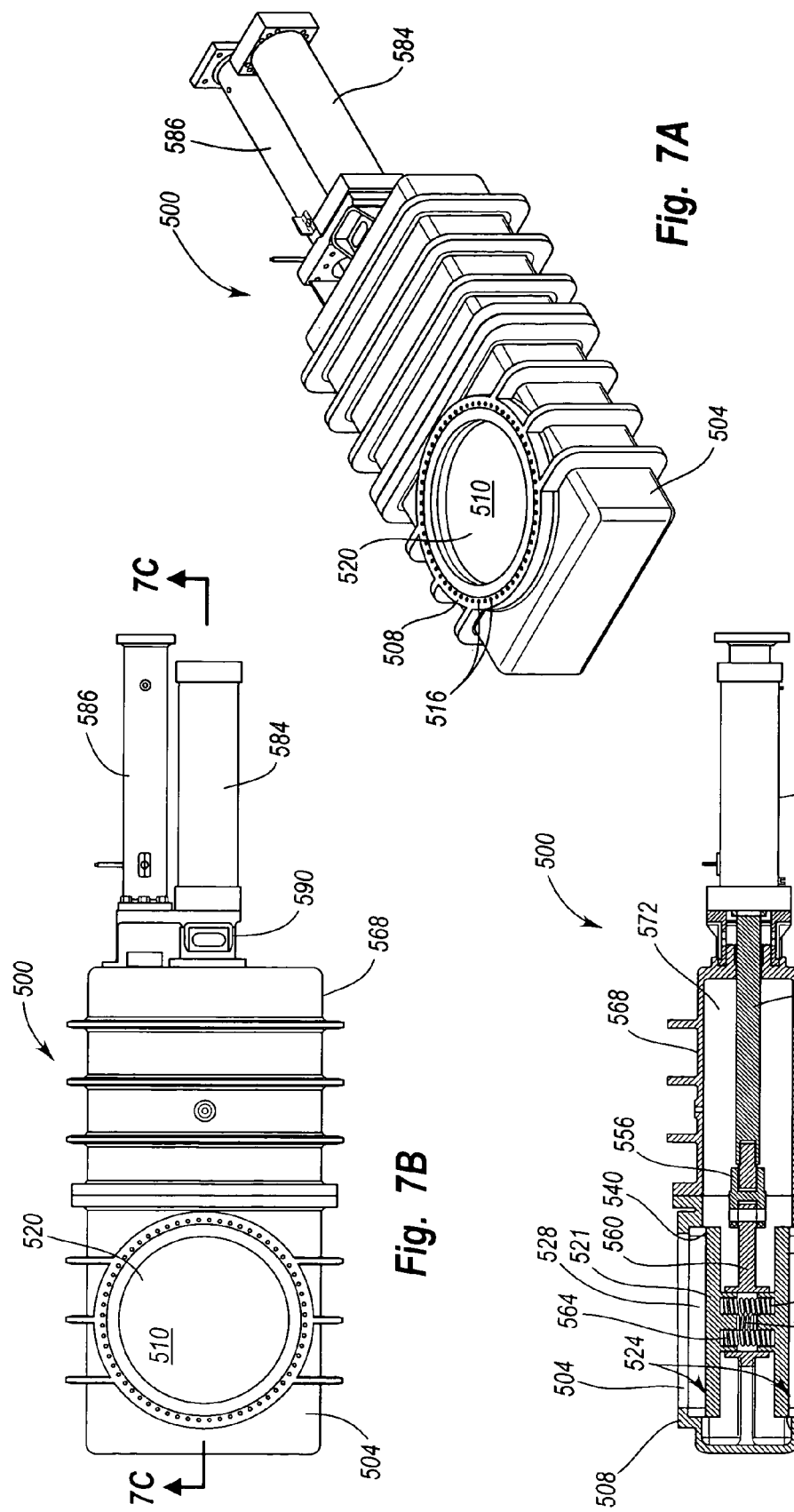

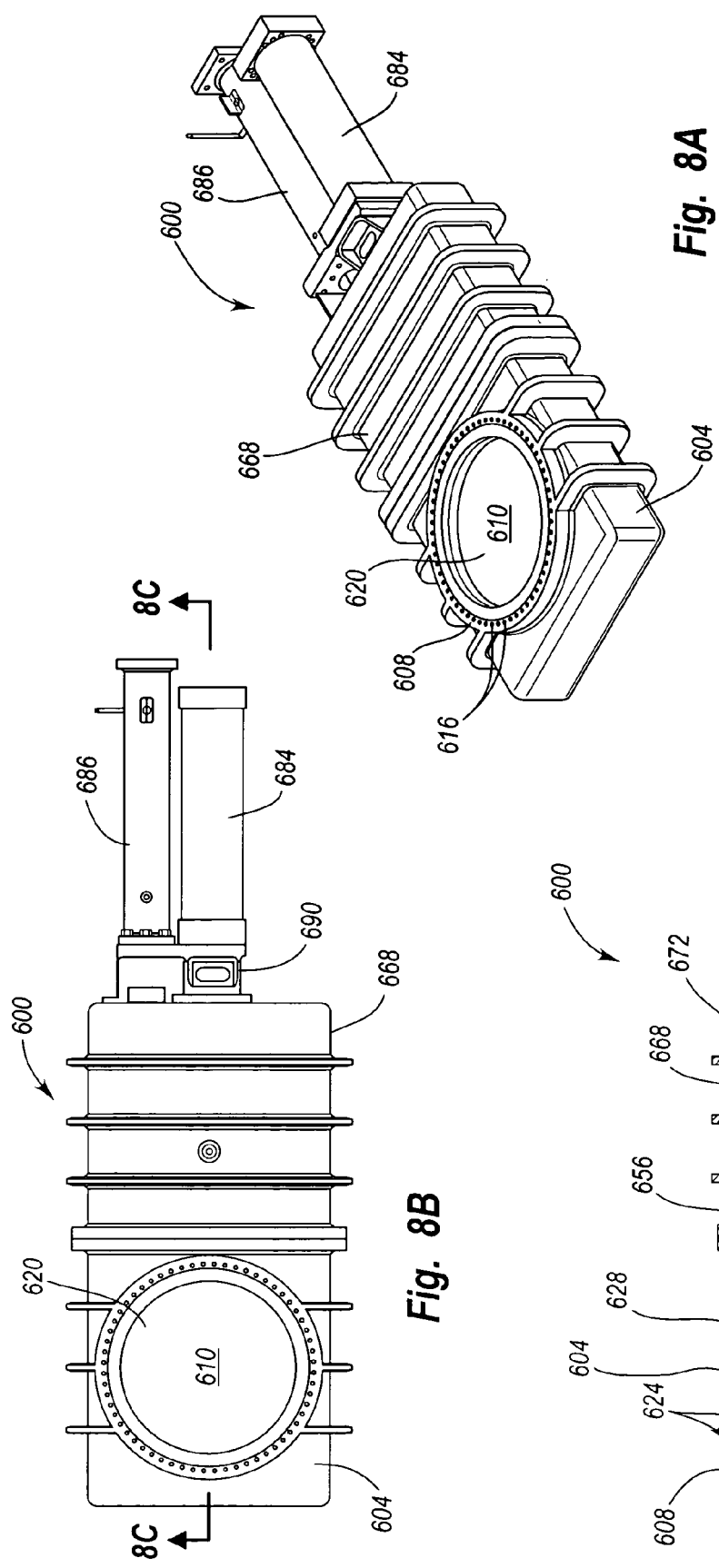
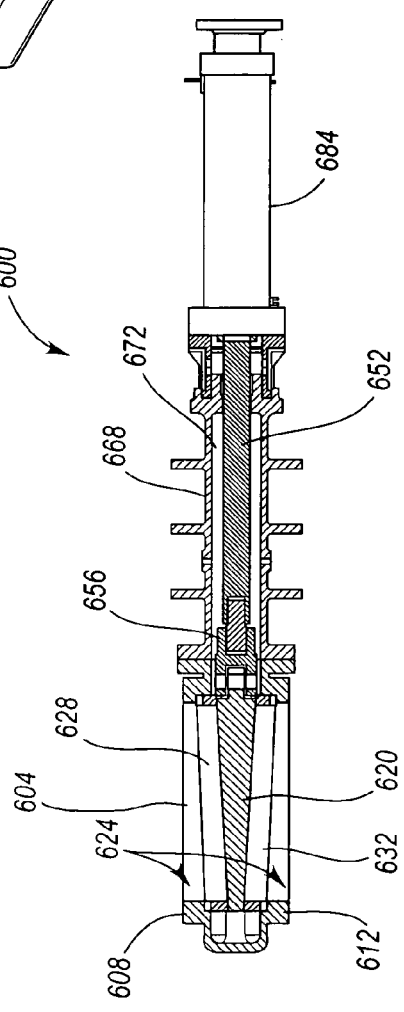
Fig. 8A
Fig. 8B
Fig. 8C

VALVE SYSTEM FOR UNHEADING A COKE DRUM

RELATED APPLICATIONS

This application claims priority to application Ser. No. 10/731,874, filed Dec. 9, 2003, entitled "Coke Drum Bottom De-Heading System." and claims priority to U.S. patent application Ser. No. 10/096,301, filed Mar. 11, 2002, entitled. "Coke Drum Bottom De-Heading System," now issued as U.S. Pat. No. 6,660,131; and to U.S. patent application Ser. No. 09/946,917, filed Sep. 5, 2001, entitled, "Coke Drum Bottom De-Heading System," now issued U.S. Pat. No. 6,565,714, which claims priority to U.S. Provisional Patent Application Ser. No. 60/275,527, filed Mar. 12, 2001, entitled, "Coke Drum Bottom De-Heading System." Each of these related applications is incorporated by reference herein in their entirety.

BACKGROUND

1. Field of the Invention

The present invention relates to the devices and systems used to de-head or unhead a vessel containing a fluid, distillate, or unconsolidated debris byproduct produced from a manufacturing process, such as the several types of coke produced from a petroleum refinery process, as well as to the several methods employed for unheading a vessel utilizing such devices or systems. Specifically, the present invention relates to various unheading valves, and associated methods, namely various de-header valves that may be coupled to a coke drum, particularly at its top and/or bottom openings, wherein the valve functions to safely, effectively, and efficiently de-head or unhead the coke drum following the manufacture of coke, or other byproducts, and to facilitate the removal of coke during the decoking process.

2. Background

In the hydrocarbon processing industry, many refineries recover valuable products from the heavy residual oil that remains after refining operations are completed. This recovery process is known as delayed coking and produces valuable distillates and coke in large vessels or coke drums. Coke drums are usually in operation in pairs so that when one coke drum is finished being filled with the byproduct or residual material via a feed, the feed may be directed to an empty drum so that the filled drum may be cooled and the byproduct purged from the coke drum. The process of purging coke from a coke drum in known as decoking. This allows the refinery process to operate in a cyclical, continuous manner, without undue interruption.

As stated, when one coke drum is full, it must be purged of the byproduct it holds in preparation for refilling the coke drum in another cycle. First, the coke drum is steam purged and cooled with quench water. The coke drum is then drained of water and vented to atmospheric pressure, after which the top and bottom flanges are removed. Removing the top and bottom flanges effectively functions to de-head the coke drum. Stated another way, removal of the flanges effectively removes the coke head that formed during the manufacturing process that is adjacent the flanges. Once the coke drum is de-headed, the coke remaining within the coke drum is removed (typically by water cutting the coke from the drum) and emptied into a catch basin, typically a rail car. Once the coke is removed, the heads are replaced and the coke drum is prepared to repeat the cycle.

This process of unheading or de-heading the coke drum can be extremely dangerous for several reasons. To mention only a few, the cooling water introduced into the hot drums prior to the removal of the bottom flange becomes extremely hot and could leak from the loosened flange and scald surrounding operators, the load of un-drained water and loose coke within the drum may exceed the limits of the support system and cause heavy equipment to fall, positioning the chute and necessary removal of the flanges or heads is done with operators who are in close proximity to the drums, loose coke within the coke drum may fall and injure workers as the flanges are removed, and operating personnel may be exposed to finely divided coke particles, steam, hot water and noxious gases, when the drum is opened. Unfortunately, several accidents and even some fatalities occur each year as a result of the de-heading process used during this particular type of manufacturing process.

Prior art systems and methods have tired to more efficiently and effectively de-head coke drums, as well as to minimize many of the dangers inherent is the de-heading process. One such method involves placing a de-heading cart under the drum, raising a flange support ram, with braces installed, and loosening some (up to one half) of the flange bolts by manual operation with an impact wrench. Following the water quench and drain, the remaining bolts are manually removed, braces are removed from the ram, the approximately 4-ton flange is lowered, and the cart, with flange resting thereon, is moved away. As is evident, this manual, hands-on process is extremely dangerous and has resulted in several accidents and deaths.

Other systems have been disclosed, which somewhat reduce human or manual involvement. For example, U.S. Pat. Nos. 4,726,109 to Malsbury et al. and 4,960,358 to DiGiacomo et al. describe a remote unheading device for coking drums. The device includes a head unit for attachment to a lower flange of a coking drum and a plurality of swing bolts which are disconnected by remotely operated de-tensioning equipment. A platform device lowers the head unit, moves it laterally to one side and tips it for cleaning. A chute attached to the frame can be raised into engagement with the coking drum lower flange for removal of coke from the drum.

U.S. Pat. No. 5,098,524 to Antalfy et al. filed on Dec. 10, 1990 discloses a coke drum unheading device having a pivoting actuator system operable from a location remote from a drum outlet. The actuator is adapted to move a drum head between closed and open positions and to retain the drum head in a closed position under a load.

U.S. Pat. No. 5,500,094 to Fruchtbaum provides a coke drum unheading device that retracts and tilts the bottom head incrementally so that falling debris such as shot coke can be caught by a chute. Following disposal of the loose debris, the head can be withdrawn from the area of the drum for maintenance. Specifically, the invention provides an unheading device for removing a bottom head from a flange on a lower end of a coke drum. An unheading car is horizontally movable into and from position below the bottom head. A vertically adjustable bottom head support member is mounted on the car. A bearing plate is pivotally mounted at an upper end of the support member for engaging a lower surface of the bottom head. A retractable arm has first and second sections hingedly connected at one end and having respective opposite ends secured to the bearing plate and the support member for pivoting the bearing plate and bottom head supported thereon with respect to horizontal, preferably to tilt the head towards an adjacent chute.

U.S. Pat. No. 5,581,864 to Rabet discloses an apparatus and method enabling removal of the drum head of a coke drum, which comprises an apparatus remotely placing a carriage under the drum head and the carriage is adapted to remotely engage the drum head, tightly support the head against the drum while workers are in the area, and to lower the head and carry it away. A safety feature is also included and disclosed, wherein the carriage is normally supported by springs which, in the event of excessive loads, automatically transfers the load carrier to an overhead beam designed to carry any excessive loads.

Each of these prior art devices share common deficiencies in that they are incapable of providing simple, efficient, and safe solutions to the de-heading of a coke drum. Specifically, each of the assemblies or devices require that the head or flange unit be completely removed from the adjacent or matching flange portion of the coke drum after each coking cycle and prior to the purging of the coke from the coke drum. This creates an extreme hazard to workers and provides an inefficient and time consuming procedure. In addition, the requirement to remove the flange or head unit increases the chance for accident, while at the same time increases human involvement as the head unit must be properly secured to the coke drum each operating cycle, despite the automation involved. Still, a large amount of floor space is required to accommodate those assemblies and devices that automate the removal and lifting of the flange or head unit from the coke drum. Finally, such devices and systems may not be operable in an environment where there the bottom headroom is less than the diameter of the bottom head.

As with every industry in the modern world, advances in technology are made for several reasons, some of which include safety, reliability, economy, ease of operation and maintenance, utility, and for other similar benefits. If advancement of a technology provides improvements in any of the above categories it is said to have true and veritable value. Generally speaking, advances in Coker technology have come gradually as competing companies have built upon existing technologies or operational methods by making improvements and modifications to base designs or concepts. Through this process, some technologies utilized in the Delayed Coking industry have become optimized, meaning that all of the benefits and advantages that can be obtained or derived from these technologies have been maximized.

Due to the inherently hazardous operation and maintenance of delayed coking systems, general trends in the Delayed Coking industry have emphasized increased safety, efficiency, and reliability. It goes without saying that any ancillary or incidental improvements in economy, utility, and ease of maintenance would be added and welcomed benefits to any innovation that effectively increases safety, efficiency, and reliability. Indeed, it is because of safety issues that many owners and operators of delayed coking systems are thinking forward to the time when total automation of a Coker Unit becomes a possibility and a reality. Obviously, there are many technical challenges associated with accomplishing this goal.

Presently, one of the primary roadblocks to the total automation concept is the systems and methods currently employed for de-heading a coke drum or similar vessel. Whether coke drum de-heading is done entirely manually, or by any one of the above discussed prior art limited automation or semi-automated systems and devices that are currently available, there is still a significant physical human on component required in the process, primarily due to the systems and methods utilized.

SUMMARY

In light of the problems and deficiencies inherent in prior related coke drum unheading systems and devices, the present invention seeks to provide more efficient, cost-effective, and safe coke drum unheading devices and systems, as well as more efficient, cost-effective, and safe methods for unheading a coke drum or other similar vessel.

Some embodiments of the present invention feature a coke drum de-header system comprising: (a) a coke drum having at least one port therein, said coke drum receiving byproduct material from a manufacturing system and process; (b) a de-header valve removably coupled to the coke drum for regulating the port of the coke drum and for allowing repeated de-heading and re-heading of the coke drum, said de-header valve comprising (1) a main body having an orifice dimensioned to align with the port of the coke drum when the de-header valve is coupled thereto; (2) a valve closure operably supported by the main body, wherein the valve closure is capable of being actuated to oscillate between an open and closed position with respect to the orifice of the de-header valve and the port of the coke drum; (3) means for supporting the valve closure; (c) a continuously maintained metal to metal contact seal between the valve closure and the means for supporting the valve closure that contributes to valve isolation, wherein the contact seal functions to shear any coke or other byproduct material that has accumulated near the port of the coke drum, thus effectively de-heading the coke drum upon actuation of the valve closure; and (d) means for actuating the valve closure.

The de-header valve is removably coupled to and seals against the flanged portion of a coke drum and over its port much the same way a conventional flange or head unit would be attached. The de-header valve is equipped with a valve closure that regulates the closing and opening of the coke drum, or rather regulates the opening and closing of the coke drum port and its associated throughput. Thus, in a closed position, the de-header valve and coke drum are prepared to receive the byproduct feed from the refinery process used to manufacture coke. As the coke drum is being filled during one stage of a decoking process, the de-header valve, and particularly the valve closure, is actuated and positioned in a closed position, wherein a seal is formed between the valve closure and the means for supporting the valve closure. Once the coke drum is filled, the valve closure is again actuated causing it to transition from a closed position to an open or semi-opened position. This opening action functions to shear any coke or other debris that accumulated on the valve closure or at or near the port of the coke drum, thus effectively de-heading the coke drum.

Shearing occurs because of the continuously maintained metal to metal contact between the valve closure and the means for supporting the valve closure. As the valve closure is caused to move, its metal surface slides about the metal surface of the means for supporting the valve closure, thus shearing the coke from and otherwise breaking its connection or attachment with the valve closure. Once the valve is opened and the coke drum de-headed, the coke may be removed from the coke drum using commonly known methods, techniques, and equipment.

The de-header valve of the present invention may comprise one of several forms or types of valves. For example, but not limiting in any way, the de-header valve comprise a valve-type selected from the group consisting of a plug valve, a ball or globe valve, a flexible wedge gate valve, a parallel slide gate valve, a solid wedge gate valve, and a sliding blind gate valve. Each of these valve-types, although functioning somewhat differently, are designed to comprise a continuously maintained metal to metal contact seal to create valve isolation and to provide the means for shearing the coke from the valve closure, thus de-heading the coke drum. As such, the coke drum de-heading system provides unique advantages over prior art or prior related de-heading systems, namely the de-heading of a coke drum without having to physically remove bulky, dangerous flange or head units.

An advantage of the present invention is its ability to provide a simple, yet effective de-heading system comprising a de-header valve having a movable valve closure that oscillates or moves back and forth about the means for supporting the valve closure to de-head a coke drum and simplify the decoking process. Another advantage of the present invention is the ability to de-head the coke drum without having to physically remove the head or flange unit, and to do so at a remote location with little or no manual requirements. Other advantages will be apparent to one skilled in the art.

In a preferred embodiment, the means for supporting the valve closure comprises a seat support system. The seat support system may comprise any arrangement or configuration of seats, depending upon the type of valve, the needs of the system, system specifications, or any other contributing factors. In one exemplary configuration, the seat support system comprises an upper and lower seat existing on either side of the valve closure, wherein the upper seat and lower seat may be independent from one another. Still further, the upper and lower seat may be comprised of either a static or dynamic nature, such that one may be static and the other dynamic, both dynamic, or both static.

In another exemplary embodiment, the seat support system comprises a single seat situated or disposed between the main body of the de-header valve and the valve closure. In this configuration, the single seat applies a continuous force to the valve closure throughout its oscillation. The single seat may be a floating or dynamic seat, or it may be a static seat, again depending upon the type of valve, the needs of the system, system specifications, or any other contributing factors.

In several embodiments, the biasing necessary to maintain bug term sealing is provided by the gate itself. Several gates are biased against the seat to provide the same contact that would occur if the seat were biased toward the gate.

In a preferred embodiment, the seat support system advantageously provides a floating seat concept to the de-header valve using at least one dynamic, live loaded seat. This floating dynamic, live loaded seat is continuously loaded against the valve closure to create a biased relationship between the seat(s) and the valve closure. The floating seat concept is accomplished using one or a combination of biasing members, such as heavy coil springs arrayed at close centers around the perimeter of the seat ring; externally live loaded and sealed seat force applicators arrayed at quadrants around the floating seats; and/or a full perimeter flexible inconnel bellow seal spring placed between the floating seat and the seat retaining ring. A floating or dynamic seat provides many advantages, a primary one being that the seat support system and the valve closure are able to flex and distort in response to the rigorous and changing pressures and forces induced thereon during the coke manufacturing process and filling of the coke drum.

In another exemplary embodiment, means for supporting the valve closure comprises the main body itself. In this embodiment, no seats are required as various structural modifications can be made to the main body to support the valve closure. However, it is contemplated that a seat may be used to support the valve closure on one side and the main body on the other.

The continuously maintained contact seal comprises a sealing system that seals directly against the valve closure. This may be a point to point sealing system. The seal preferably consists of or is a result of the metal to metal seating between the valve closure and the means for supporting the valve closure, such as upper and lower seats. Moreover, an identifiable and calculated force is created or induced between these two components and maintained in a continuous manner as the valve closure oscillates between its open and closed positions. In one exemplary embodiment, the amount of force required to properly seal the valve closure and the means for supporting the valve closure is provided via a seat support system, wherein one or more of the seats may be a floating or dynamic seat coupled to a seat adjustment mechanism designed to control the amount of force exerted on the valve closure through or by the seat.

The present invention coke drum de-header system further comprises a steam purge system. The system utilizes pressure valves and steam purge inlet valves, as well as emergency vent valves to monitor and control pressure within the system and to prevent inadvertent venting of the steam to atmosphere.

The present invention coke drum de-header system further comprises an internal coke containment system that provides or maintains total isolation of the coke within the system. The internal coke containment system comprises the metal to metal contact seal described herein, as well as a unique component configuration existing within the bonnets of the de-header valve.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 2 illustrates a general diagram representative of any type of de-header valve as it connects to a coke drum and upper and lower bonnet within a coke drum de-heading system according to an exemplary operating environment of the present invention;

FIG. 3-A illustrates a perspective view of a wedge plug-type de-header valve according to one exemplary embodiment of the present invention;

FIG. 3-B illustrates a cut-away side view of the wedge plug-type de-header valve of FIG. 3-A;

FIG. 4-B illustrates a cut-away side view of the ball-type de-header valve of FIG. 4-A;

FIG. 5-A illustrates a perspective view of an adjusting wedge gate-type de-header valve according to one exemplary embodiment of the present invention;

FIG. 5-B illustrates a top view of the adjusting wedge gate-type de-header valve of FIG. 5-A;

FIG. 5-C illustrates a cut-away side view of the adjusting wedge gate-type de-header valve of FIG. 5-A;

FIG. 6-A illustrates a perspective view of a flexible wedge gate-type de-header valve according to one exemplary embodiment of the present invention;

FIG. 6-B illustrates a top view of the flexible wedge gate-type de-header valve of FIG. 6-A;

FIG. 6-C illustrates a cut-away side view of the flexible wedge gate-type de-header valve of FIG. 6-A;

FIG. 7-A illustrates a perspective view of a parallel slide gate-type de-header valve according to one exemplary embodiment of the present invention;

FIG. 7-B illustrates a top view of the parallel slide gate-type de-header valve of FIG. 7-A;

FIG. 7-C illustrates a cut-away side view of the parallel slide gate-type de-header valve of FIG. 7-A;

FIG. 8-A illustrates a perspective view of a solid wedge gate-type de-header valve according to one exemplary embodiment of the present invention;

FIG. 8-B illustrates a top view of the solid wedge gate-type de-header valve of FIG. 8-A;

FIG. 8-C illustrates a cut-away side view of the solid wedge gate-type de-header valve of FIG. 8-A;

FIG. 9-B illustrates a top view of the sliding blind gate-type de-header valve of FIG. 9-A;

FIG. 9-C illustrates a cut-away side view of the sliding blind gate-type de-header valve of FIG. 9-A;

DETAILED DESCRIPTION OF THE PREFERRED EMBODIMENTS

Figure 1:
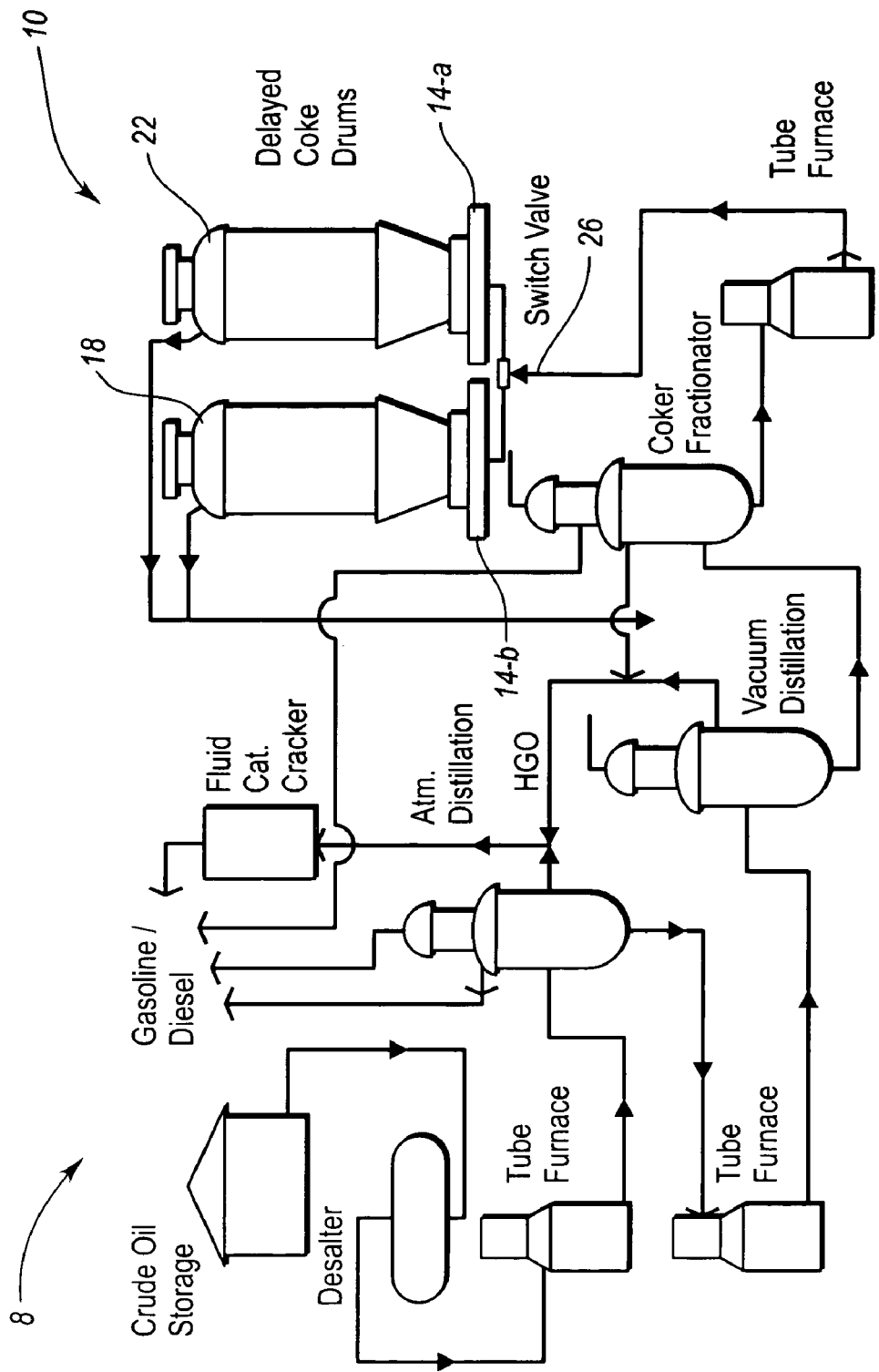
FIG. 1 illustrates, generally, an exemplary refinery process, wherein refinery byproducts are routed to a series of coke drums for the manufacture of coke, and wherein the coke drums are equipped with the de-header valves of the present invention.

It will be readily understood that the components of the present invention, as generally described and illustrated in the figures herein, could be arranged and designed in a wide variety of different configurations. Thus, the following more detailed description of the embodiments of the system, device, and method of the present invention, as represented in FIGS. 1 through 11, is not intended to limit the scope of the invention, as claimed, but is merely representative of the presently preferred embodiments of the invention.

The presently preferred embodiments of the invention will be best understood by reference to the drawings wherein like parts are designated by like numerals throughout. Although reference to the drawings and a corresponding discussion follow below, the following more detailed description is divided into sections. The first section pertains to and sets forth a general discussion of the delayed coking process, including the process and effects of de-heading a coke drum at the end of a coke manufacturing cycle. The second section pertains to and sets forth the coke drum de-heading system, including the variety of valves or valve-types that may be utilized in the coke drum de-heading system and within a delayed coking process, as well as the various methods for utilizing the system within a delayed coking or other similar environment. It is noted that these sections are not intended to be limiting in any way, but are simply provided as convenience to the reader.

General Discussion on the Delayed Coking Process and the De-Heading of Coke Drums In the typical delayed coking process, high boiling petroleum residues are fed to one or more coke drums where they are thermally cracked into light products and a solid residue—petroleum coke. The coke drums are typically large cylindrical vessels having a top head and a conical bottom portion fitted with a bottom head. The fundamental goal of coking is the thermal cracking of very high boiling point petroleum residues into lighter fuel fractions. Coke is a byproduct of the process. Delayed coking is an endothermic reaction with a furnace supplying the necessary heat to complete the coking reaction in a drum. The exact mechanism is very complex, and out of all the reactions that occur, only three distinct steps have been isolated: 1) partial vaporization and mild coking of the feed as it passes through the furnace; 2) cracking of the vapor as it passes through the coke drum; and 3) cracking and polymerization of the heavy liquid trapped in the drum until it is converted to vapor and coke. The process is extremely temperature-sensitive with the varying temperatures producing varying types of coke. For example, if the temperature is too low, the coking reaction does not proceed far enough and pitch or soft coke formation occurs. If the temperature is too high, the coke formed generally is very hard and difficult to remove from the drum with hydraulic decoking equipment. Higher temperatures also increase the risk of coking in the furnace tubes or the transfer line. As stated, delayed coking is a thermal cracking process used in petroleum refineries to upgrade and convert petroleum residuum (or resid) into liquid and gas product streams leaving behind a solid concentrated carbon material, or coke. A fired heater is used in the process to reach thermal cracking temperatures, which range upwards of 1,000° F. With short residence time in the furnace, coking of the feed material is thereby "delayed" until it reaches large coking drums downstream of the heater. In normal operations, there are two coke drums so that when one is being filled, the other may be purged of the manufactured coke. These coke drums are large structures that are approximately 25-30 meters in height and from 4 to 9 meters in diameter. They are equipped with a top blind flange closure or orifice that is typically about 1.5 meters in diameter, and a bottom blind flange orifice that is typically about 2 meters in diameter.

In a typical petroleum refinery process, several different physical structures of petroleum coke may be produced. These are namely, shot coke, sponge coke, and/or needle coke (hereinafter collectively referred to as "coke"), and are each distinguished by their physical structures and chemical properties. These physical structures and chemical properties also serve to determine the end use of the material. Several uses are available for manufactured coke, some of which include fuel for burning, the ability to be calcined for use in the aluminum, chemical, or steel industries, or the ability to be gasified to produce steam, electricity, or gas feedstock for the petrochemicals industry.

To produce the coke, a delayed coker feed originates from the crude oil supplied to the refinery and travels through a series of process members and finally empties into one of the coke drums used to manufacture coke. A basic refinery flow diagram is presented as FIG. 1, with two coke drums shown. The delayed coking process typically comprises a batch-continuous process, which means that the process is ongoing or continuous as the feed stream coming from the furnace alternates filling between the two or more coke drums. As mentioned, while one drum is on-line filling up with coke, the other is being stripped, cooled, decoked, and prepared to receive another batch. In the past, this has proven to be an extremely time and labor intensive process, with each batch in the batch-continuous process talking approximately 12-20 hours to complete. In essence, hot oil, or resid as it is commonly referred to, from the tube furnace is fed into one of the coke drums in the system. The oil is extremely hot and produces hot vapors that condense on the colder walls of the coke drum. As the drum is being filled, a large amount of liquid runs down the sides of the drum into a boiling turbulent pool at the bottom. As this process continues, the hot resid and the condensing vapors cause the coke drum walls to heat. This naturally in turn, causes the resid to produce less and less of the condensing vapors, which ultimately causes the liquid at the bottom of the coke drum to start to heat up to coking temperatures. After some time, a main channel is formed in the coke drum, and as time goes on, the liquid above the accumulated coke decreases and the liquid turns to a more viscous type tar. This tar keeps trying to run back down the main channel which can coke at the top, thus causing the channel to branch. This process progresses up through the coke drum until the drum is full, wherein the liquid pools slowly turn to solid coke. When the first coke drum is full, the hot oil feed is switched to the second coke drum, and the first coke drum is isolated, steamed to remove residual hydrocarbons, cooled by filling with water, opened, and then decoked. This cyclical process is repeated over and over again throughout the manufacture of coke.

The decoking process is the process used to remove the coke from the drum upon completion of the coking process. Due to the shape of the coke drum, coke accumulates in the area near and attaches to the flanges or other members used to close off the opening of the coke drum during the manufacturing process. To decoke the drum, the flanges or members must first be removed or relocated. In the case of a flanged system, once full, the coke drum is vented to atmospheric pressure and the top flange (typically a 4-foot diameter flange) is unbolted and removed to enable placement of a hydraulic coke cutting apparatus. After the cooling water is drained from the vessel, the bottom flange (typically a 7-foot-diameter flange) is unbolted and removed. This process is commonly known as "de-heading" because it removes or breaks free the head of coke that accumulates at the surface of the flange. As indicated above, de-heading a coke drum can be a very dangerous procedure, namely because of the size of the flanges, the high environmental temperatures within the drum, the potential of loose coke to fall, and other reasons. Once the flanges are removed, the coke is removed from the drum by drilling a pilot hole from top to bottom of the coke bed using high pressure water jets. Following this, the main body of coke left in the coke drum is cut into fragments which fall out the bottom and into a collection bin, such as a bin on a rail cart, etc. The coke is then dewatered, crushed and sent to coke storage or a loading facility.

Present Invention Coke Drum De-Heading System

Although the present invention is intended to cover both top and bottom de-heading systems, or rather the de-heading system of the present invention may be applicable and utilized on both the top and bottom openings of a coke drum, the following detailed description and preferred embodiments will be discussed in reference to a bottom de-heading system only. One ordinarily skilled in the art will recognize that the invention as explained and described herein for a coke drum bottom de-heading system may also be designed and used as a coke drum top de-heading system, and that the following discussion pertaining to the bottom de-heading system is limited to such.

The present invention describes a valve system and method for unheading or de-heading a coke drum following the manufacture of coke therein. As the present invention is especially adapted to be used in the coking process, the following discussion will relate specifically in this manufacturing area. It is foreseeable however, that the present invention may be adapted to be an integral part of other manufacturing processes producing various elements or by products other than coke, and such processes should thus be considered within the scope of this application. For example, it is contemplated that the present invention de-header system and de-header valves may be utilized within other critical service applications, such as inlet feed line isolation, blowdown isolation, fractionator isolation, and back warming.

Prior to reciting the specifics of the present invention, it should be noted that the present invention system and method is designed to have or possess significant functional, utility, and safety advantages over prior related designs and systems. These should be kept in mind when reading the following detailed disclosure.

First, the system is capable of automatic and repeated unheading (or de-heading) of a coke drum with little or no manual intervention required at or nearby the coke drum. Thus, safety and efficiency are both dramatically increased. Second, the system reduces the total de-heading to re-heading time to less than 10 minutes. Such a time is a drastic improvement over the times of prior art de-heading systems. Third, the de-header valve may be removably fixed or coupled directly to the coke drum flange, or to a transition spool above the de-header valve, as well as to a stationary coke chute below the device, which chute discharges directly into a collection bin or rail car. Fourth, the system has the flexibility to allow safe drainage of coke and drum water through its outlet port and into the pit without any spillage onto the de-heading deck. Fifth, the system is designed and constructed in a way to ensure long term operation without clogging or being operationally obstructed by coke particles, chunks, resid, or any other foreign matter. Sixth, the system is designed to be able to demonstrate, with absolute certainty, at all times and at all local and remote locations that it is positively isolating. Seventh, the system is virtually maintenance free except for long term parts replacement during scheduled shutdowns. Thus there are virtually no maintenance costs beyond the scheduled maintenance times. Eighth, the system is capable of incorporating diagnostic capabilities that allow real time assessment and trending of the condition of sealing components during normal operations, in order to facilitate planned maintenance. Ninth, the system is easy to install as compared with other systems, and is capable of being serviced in the field or on-site. Tenth, the system is cost competitive with existing technology, yet significantly outperforms this technology in virtually every aspect. Eleventh, the de-header valve and system functions to increase the throughput of the delayed coking system. The de-header system may be configured to allow drainage or water through the port, and drainage of water and coke through the port. Twelfth, the system comprises a simple mechanical design and is extremely simple to operate. Thirteenth, the system is totally enclosed from the top head of the coke drum to the receiving area or collection bin, thus no exposure to personnel, the unheading deck, or to plant equipment. Fourteenth, all required safety interlocks are incorporated. Fifteenth, operating costs are low. For instance, there are no head gaskets or feed line coupling gaskets to replace at each drum cycle; nor are there any feed line coupling or alignment systems to maintain; there is no water flushing required after each cycle; there is no disassembly, cleaning, and re-assembly required after each cycle; and there are no parts or tools that need replacing at each cycle. Sixteenth, the de-header valve and system comprises a steam purged body that utilizes a diagnostics tool, that regulates body temperature, and that creates a barrier against coke migration. Seventeenth, the de-header valve may be quickly assembled and installed onto a coke drum and disassembled and uninstalled from a coke drum, and is rebuildable on-site during shutdowns.

Specifically regarding safety issues, there is no exposure to coke drum contents whether onto the de-heading deck, to personnel, anywhere or at anytime during the coke drum de-heading process, or during any automated, manual, or inadvertent operation of the de-header valve during a switching cycle. Also, the system comprises a simple, redundant hydraulic design with one hydraulic power unit and one cylinder, and one supply and one return hydraulic line. Therefore, there is less exposure to possible leaks during commissioning and startup as well as less opportunity for accidental or inappropriate normal operation. Further, the system comprises a positive mechanical lockout device in the form of a lockout pin, that may be incorporated during both open and closed positions of the valve. Still further, a compact hydraulic backup device for the open and close functions is supplied with the system, or is easily installed at the site, without exposing personnel. Still further, coke drum inlet feed line coupling and alignment devices are not required, therefore, there are no inlet line-coupling gaskets to replace or clean following each drum cycle, or exposure to personnel due to coupling misalignment and leakage.

Specifically regarding reliability, the system comprises a simple redundant hydraulic design as described above. The system also comprises one major moving part instead of multiple moving parts as found on existing devices and systems. This significantly increases the ease of operation, as well as the durability of the system because there is less that can go wrong or less moving parts that can malfunction. Moreover, the isolation and containment of the coke provide a clean operating atmosphere that contributes to the durability and robust nature of the system.

Specifically regarding economy, there are no head gaskets to replace after each drum cycle or after a failed coke drum pressure test. Furthermore, very little to no routine maintenance is required during normal operation. Still further, the system comprises a compact and basic operating control console that can be strategically located and installed with minimal effort and with all desired safety interlocks. Still further, the system comprises internal diagnostic capabilities that allow the operator to schedule maintenance to coincide with planned shutdown times. Still further, no water flushing of moving parts is required. Still further, the coke drum inlet feed line coupling and alignment devices are not required, thus there are no inlet line coupling gaskets to replace or clean after each cycle. Still further, minimum spare parts are required to be kept on hand, thus parts and storage costs can be reduced. Finally, the system can be configured to allow drainage of the drum water directly through the port on the coke drum.

Specifically regarding ease of operation and maintenance, only an open and closed function is required, there is no water flushing of moving parts required, there is no head gasket surface cleaning required, which in most cases is difficult to perform and requires special tools, there are minimal spare parts required, and the operating system may be strategically located and compact and easy to use.

Specifically regarding utility, the system is designed to be used on either the top or bottom ports of the coke drum. Moreover, the system is designed for use in other industries or for other critical use systems.

These several advantages presented herein are not to be limiting in any way. Indeed, other advantages beyond these are contemplated and will be apparent to one skilled in the art.

Turning to the Figures of the present invention and a more detailed analysis, FIG. 1 depicts, generally, a petroleum manufacturing and refinery process 8 having several elements and systems present (identified, but not discussed). In addition to these elements, petroleum manufacturing and refinery process 8 further comprises a coke drum de-heading system 10 that includes first and second delayed coke drums 18 and 22, respectively, and de-header valves 14-a and 14-b attached thereto. As mentioned, there are typically at least two coke drums in simultaneous operation so as to permit the ongoing manufacture and refinery of petroleum as well as its coke byproduct. While first coke drum 18 is online and being filled via feed inlet 26, second coke drum 22 is going through a decoking process to purge the manufactured coke contained therein. Thereafter, when first coke drum 18 has reached capacity, feed inlet 26 is switched to second coke drum 22 that has just previously been purged of its contents, whereby first coke drum 18 is primed for the decoking process where its contents will be purged. This cyclical process, commonly referred to as batch-continuous, allows the refinery to maintain continuous uninterrupted operation. Of course there may be only one coke drum or a plurality of coke drums present. Although FIG. 1 is illustrative of a petroleum manufacturing and refinery process having two coke drums in series, and although the discussion and preferred embodiments illustrated, described, and discussed herein focus on a coke drum de-heading system, one ordinarily skilled in the art will recognize that the present invention may be applicable or adapted to a number of different processes in which a function similar to the coking process is present.

With reference to FIG. 2, shown is a generic diagram depicting a general coke drum de-heading system 10. Coke drum de-heading system 10 comprises a de-header valve 14 that removably couples to a coke drum 18 using various known means in the art. De-header valve 14 typically couples to coke drum 18 at its flanged port or opening, much the same way a flanged head unit would be attached in prior related designs. De-header valve 14 is shown further attaching to upper and lower bonnets 30 and 34, respectively.

De-header valve 14 is shown generically because it is intended that de-header valve 14 may comprise a variety of valve types. For example, de-header valve 14 may comprise a plug valve, a ball or globe valve, a flexible wedge gate valve, a parallel slide gate valve, a solid wedge gate valve, and a sliding blind gate valve. Each of these valves are described in greater detail below.

Essentially, the variety of de-header valves each have only one major moving part, the valve closure (not shown), which assures simplicity, reliability, and ease of maintenance. The surfaces of means for supporting the valve closure (e.g., the dual, metal seat surfaces in some embodiments), the body interior, and all internal parts are fully protected and isolated from any process media in the fully open or fully closed positions. The materials used in the construction of all sealing parts are resistant to corrosion, and are designed for exceptionally high metal to metal cycle duty. The seals of the de-header valve are designed to cleanly break the bond between the coke and the exposed surface of the valve closure at each stroke. The total thrust required for this action combined with the thrust required to overcome seating friction and inertia is carefully calculated and is accomplished by actuating the valve closure, thus causing it to relocate or transition from a closed to an open position.

During the initial stages of coking, the surfaces of the valve closure will distort due to uneven heat distribution throughout its thickness. Thus, in order to compensate for thermal expansion and thermal distortion of the valve closure during heat up, the externally live loaded and dynamic metal seats of the de-heading valve are designed to articulate axially and transversely as well as conform to the induced camber of the valve closure at maximum differential temperature. This unique capability, combined with a continuously pressurized body, assures the integrity of the seal across the de-healing valve at all times during the switching cycle.

FIGS. 3-A and 3-B illustrate various views of a plug-type de-header valve 100 according to one exemplary embodiment of the present invention. In this embodiment, plug-type de-header valve 100 comprises a main body 104 that is capable of being removably coupled to a coke drum (not shown). As shown, plug-type de-header valve 100, and particularly main body 104, comprises a first flanged portion 108 and a second flanged portion 112. Main body 104 is attached to bonnet 168 via attachment means, such as bolt connection 172. First flanged portion 108 comprises a flange having an opening 110 comprising a diameter that mates or fits and aligns with a complimentary flange and opening or port of similar diameter on a coke drum. Second flanged portion 112 comprises a flange having an opening 114 comprising a diameter that mates or fits and aligns with a complimentary flange and opening or port of similar diameter on an attaching member. Plug-type de-header valve 100 is removably coupled to a coke drum via first flanged port 108 using any known connection means. Connection means may be a bolt connection, such as bolt connection 116 as shown, or any other suitable connection. First flanged port 108 functions as an inlet for plug-type de-header valve 100 and receives coke and other residual material therein from the coke drum. Second flanged port 112 functions as an outlet through which the manufactured coke and other material may pass to be further disposed within a catch basin of some sort.

Plug-type de-header valve 100 further comprises a valve closure 120 housed or contained within main body 104. Valve closure 120 may comprise a cylindrical shape, a conical shape, or any other suitable shape for a plug valve as known in the industry. As shown, valve closure 120 comprises a substantially conical shape having curved or convex sides. Valve closure further comprises an orifice 122 extending through valve closure 120. Valve closure 120 is caused to rotate within main body 104 and within a seat support system 124 that functions to hold valve closure 120 in place during operation of the valve, as well as to facilitate the de-heading of the coke drum. As valve closure 120 is rotated, orifice 122 is brought in and out of alignment with flanged port 108 and associated opening 110 and flanged port 112 and associated opening 114, thus opening and closing, respectively, plug-type de-header valve 100. Valve closure 120 is caused to rotate by outside actuating means (not shown), typically in the form of a powered motor, that couples to valve stem 152 as commonly known in the art. Valve stem 152 extends through bonnet 168 and into the interior of main body 104, where it subsequently attaches to valve closure 120 using attachment means, such as bolt connection 158.

Opposite valve stem 152 on the other side of valve closure 120 is stub shaft 160 that is also coupled to valve closure 120 via connection means, such as bolt connection 162. Upon actuation, valve stem 152 turns upon bearings 156 lodged and supported within bonnet 168, while stub shaft 160 turns upon bearings 164 lodged and supported within main body 104. Bearings 156 and 164 function to ensure proper concentric motion of valve stem 152 and valve closure 120 within main body 104, as well as to reduce rotational friction and help overcome encountered inertia. As valve stem 152 and stub shaft 160 are fixed to valve closure 120, induced or driven rotation of these components functions to also drive the rotation of valve closure 120. The rotation of valve closure 120 in this manner effectively opens and closes plug-type de-header valve 100, or rather allows plug-type de-header valve 100 to regulate the throughput of an attached coke drum.

Plug-type de-header valve 100 further comprises means for supporting valve closure 120 during its rotational phases as it moves back and forth from an open position to a semi-opened position and closed position. In the exemplary embodiment shown, means for supporting valve closure 120 comprises a seat support system 124 comprising an upper seat assembly 128 disposed within flanged port 108 and a lower seat assembly 132 disposed within flanged port 112. Seat support system 124 functions to support valve closure 120 as it is caused to rotate within main body 104, as well as to provide and maintain a continuous contact seal against valve closure 120 throughout its rotations as it opens and closes or regulates the throughput of a coke drum. Seat support system 124 may comprise several seat configurations at its upper and lower seat assemblies, including, but not limited to, dual, independent floating or dynamic seats, dual, independent static seats, a combination of a static and a floating or dynamic seat, or no seats altogether, wherein the support for valve closure 120 comes directly from the main body 104 itself or some other support member or system.

In the preferred embodiment shown, seat support system 124 comprises dual, independent seats as pair of both its upper seat assembly 128 and lower seat assembly 132. Specifically, upper seat assembly 128 comprises a static seat, seat 136, and lower seat assembly 132 also comprises a static seat, seat 138. Of course, the present invention also contemplates that either upper or lower seat assemblies 128 and 132 of plug-type de-header valve 100 may comprise a floating or dynamic, live loaded seat opposite a static seat, wherein the live loaded dynamic or floating seat would function to adjust to changing pressures and other induced conditions. Moreover, it is contemplated that either upper or lower seat assemblies 128 and 132 of the present invention plug-type de-header valve 100 may each comprise a live loaded floating or dynamic seat.

It will be obvious to one skilled in the art that any combination of floating, static, or similar type seats may be utilized by the various de-header valves of the present invention. As such, the embodiment shown in each of the Figures herein is not meant to be limiting in any way.

In the preferred embodiment, static seats 136 and 138 are securely fastened or coupled to de-header valve 100 and are disposed within seat retainers 140 and 142, respectively. Static seats 136 and 138 may or may not be adjustable depending upon design and intended use considerations. In the event one embodiment calls for a live loaded dynamic or floating seat, this seat will preferably be a moveable and adjustable seat that is energized from without the process stream via a live seat adjustment mechanism. The function of the dynamic, live loaded seat is to provide point to point fine tuning of the system, and particularly the valve closure as it is sealed between upper and lower seats 136 and 138. Various sealing members, such as O-rings, may be used to seal the seats and their adjacent seat retainers to de-header valve 100.

In another exemplary embodiment, means for supporting valve closure 120 comprises a support system provided by main body 104, without requiring some type of a seat support system. In this particular embodiment, main body 104 will comprise some type of surface adapted or made to contact valve closure 120 in a similar manner as the seat support system described above, wherein main body 104 will be capable of functioning in a similar manner to provide support of valve closure 120 and to create a continuous contact seal therebetween.

It is important to note that in each of the embodiments discussed above, it is preferable that a continuous contact seal be created between valve closure 120 and means for supporting valve closure 120, meaning that during the coke manufacturing process, as well as the back and forth rotation of valve closure 120 from an open position, to a semi-opened position, and finally to a closed position, with respect to the opening or port of a coke drum, the created contact seal is never broken or breached, but its integrity is maintained at all times. This continuous contact seal is preferably a metal to metal contact seal that performs several functions and has several advantages. First, the contact seal creates, or at least contributes to, valve isolation, wherein an isolated environment is provided, such that no material is allowed to escape outside the sealed area and into the main body or other parts of the de-header valve, the area outside the de-header valve (e.g., the unheading deck), or other areas. Various steam purge systems 176, condensate management systems 180, and coke containment systems (not shown) also function to regulate pressure within the de-header valve, to contain the material within designated areas, and to maintain valve isolation. Second, the continuous contact seal helps to keep various components of the de-header valve clean and free of the product material as these materials are not allowed beyond the sealed area. Third, as a result of the load exerted upon valve closure 120 and resulting tight tolerances existing between valve closure 120 and upper and lower seats 136 and 138, the rotation of valve closure 120 between upper and lower seats 136 and 138 causes a grinding and polishing effect to occur. In a preferred embodiment, upper and lower seats 136 and 138, as well as valve closure 120 are made of metal, thus providing a metal to metal contact or metal to metal seal, or otherwise referred to as metal to metal seating of valve closure 120. This metal to metal seating is a unique aspect of the present invention in relation to coke drum de-heading. The metal to metal seating increases the durability of the system as there are no non-metal parts, such as vinyl or rubber, used to seal the seats to valve closure 120. Metal to metal seating allows the system to achieve a higher consistency of sealing, while at the same time providing extended wear and durability. In addition, the metal to metal sealing allows the system, and specifically the sealing within the system, to be fine-tuned as needed. Fourth, as the valve closure 120 is actuated and rotated from a closed position to an open position, the contact seal existing between the surface of valve closure 1120 and the surface of means for supporting a valve closure functions to break up or shear the manufactured coke that has accumulated on or near the surface of valve closure 120, thus effectively de-heading the coke drum and facilitating the decoking process. Other functions and advantages may be realized by one skilled in the art.

Figure 4A:
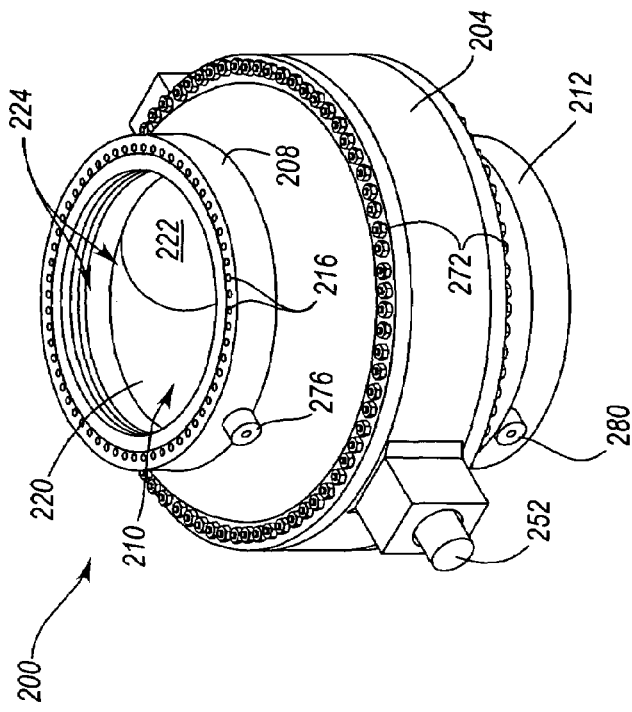
FIG. 4-A illustrates a perspective view of a rotary ball-type de-header valve according to one exemplary embodiment of the present invention.
Figure 4B:
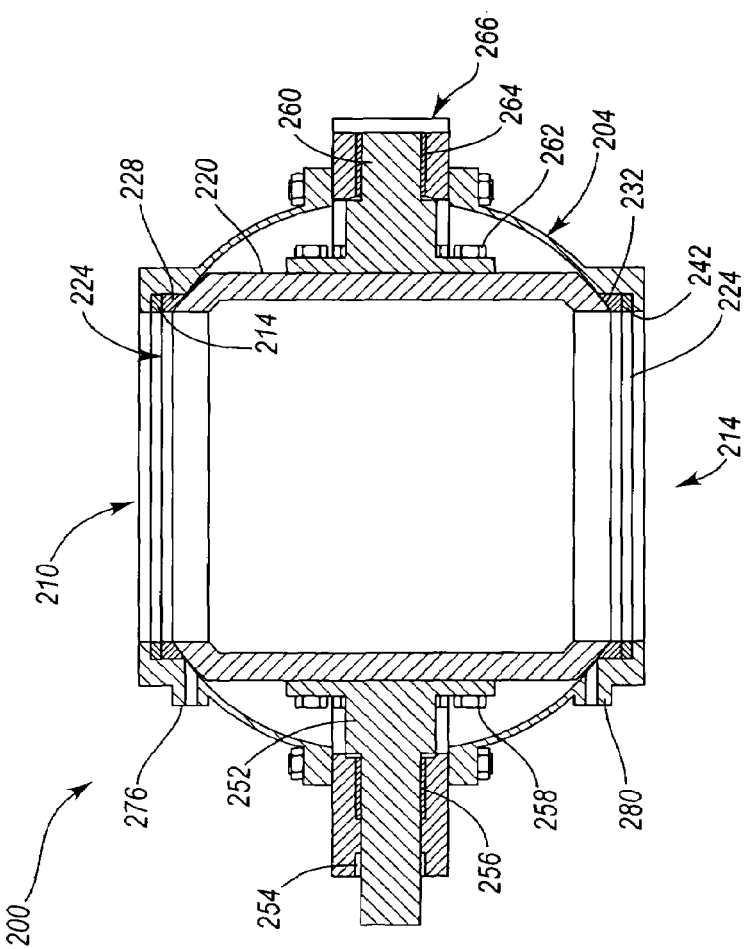

FIGS. 4-A and 4-B illustrate various views of a rotary ball-type de-header valve 200 according to one exemplary embodiment of the present invention. Ball-type de-header valve 200 functions in a similar manner as plug-type de-header valve 100 discussed above, only ball-type de-header valve 200 comprises a valve closure 220 having a round or semi-round shape that rotates between matching rounded means for supporting valve closure 220, preferably matching rounded seats, that provide uniform sealing. In the embodiment shown, ball-type de-header valve 200 comprises a main body 204 that is capable of being removably coupled to a coke drum (not shown). As shown, ball-type de-header valve 200, and particularly main body 204, comprises a first flanged port 208 and a second flanged port 212, and is attached to bonnet 268 via attachment means, such as bolt connection 272. First flanged port 208 comprises a flange having an opening 210 comprising a diameter that mates or fits and aligns with a complimentary flange and opening or port of similar diameter on a coke drum. Second flanged port 212 comprises a flange having an opening 214 comprising a diameter that mates or fits and aligns with a complimentary flange and opening or port of similar diameter on an attaching member. Ball-type de-header valve 200 is removably coupled to a coke drum via first flanged port 208 using any known connection means. Connection means may be a bolt connection, such as bolt connection 216 as shown, or any other suitable connection. First flanged port 208 functions as an inlet for ball-type de-header valve 200 and receives coke and other residual material therein from the coke drum. Second flanged port 212 functions as an outlet through which the manufactured coke and other material may pass to be further disposed within a catch basin of some sort. Steam purge port 276 and condensate port 280 provide additional advantages as described above.

Ball-type de-header valve 200 further comprises a valve closure 220 housed or contained within main body 204. Valve closure 220 comprises a round or substantially or semi-round shape having an orifice 222 extending therethrough. Valve closure 220 is caused to rotate within main body 204 and within a matching seat support system 224 that functions to hold valve closure 220 in place during operation of the valve, as well as to facilitate the de-heading of the coke drum. As valve closure 220 is rotated, orifice 222 is brought in and out of alignment with flanged port 208, with its associated opening 210, and flanged port 212, with its associated opening 214, thus opening and closing, respectively, ball-type de-header valve 200. Valve closure 220 is caused to rotate by outside actuating means (not shown), typically in the form of a powered motor, that couples to drive shaft 252 as commonly known in the art. Drive shaft 252 extends through packing 254, main body 204, and into its interior, where it subsequently attaches to valve closure 220 using attachment means, such as bolt connection 258. Opposite drive shaft 252 on the other side of valve closure 220 is stub shaft 260 that is also coupled to valve closure 220 via connection means, such as bolt connection 262 and contained by end cover 266. Upon actuation, drive shaft 252 turns upon bearings 256 lodged and supported within main body 204, while stub shaft 260 turns upon bearings 264 lodged and supported within main body 204 on an opposite side of valve closure 220. Bearings 256 and 264 function to ensure proper concentric motion of drive shaft 252 and valve closure 220 within main body 204, as well as to reduce rotational friction and help overcome encountered inertia. As drive shaft 252 and stub shaft 260 are fixed to valve closure 220, induced or driven rotation of these components functions to also drive the rotation of valve closure 220. The rotation of valve closure 220 in this manner effectively opens and closes ball-type de-header valve 200, or rather allows ball-type de-header valve 200 to regulate the throughput of an attached coke drum.

Ball-type de-header valve 200 further comprises means for supporting valve closure 220 during its rotational phases as it moves back and forth from an open position to a semi-opened position and closed position. In the exemplary embodiment shown, means for supporting valve closure 220 comprises a seat support system 224 comprising an upper seat assembly 228 disposed within flanged port 208 and a lower seat assembly 232 disposed within flanged port 212. Seat support system 224 functions to support valve closure 220 as it is caused to rotate within main body 204, as well as to provide and maintain a continuous contact seal against valve closure 220 throughout its rotations as it opens and closes or regulates the throughput of a coke drum. Seat support system 224 may comprise several seat configurations at its upper and lower seat assemblies, including, but not limited to, dual, independent floating or dynamic seats, dual, independent static seats, a combination of a static and a floating or dynamic seat, or no seats altogether, wherein the support for valve closure 220 comes directly from the main body 204 itself or some other support member or system. In the preferred embodiment shown, seat support system 224 comprises dual, independent seats as part of both its upper seat assembly 228 and lower seat assembly 232. Specifically, upper seat assembly 228 comprises a static seat, seat 236, and lower seat assembly 232 also comprises a static seat, seat 238. Of course, the present invention also contemplates that either upper or lower seat assemblies 228 and 232 of ball-type de-header valve 200 may comprise a floating or dynamic, live loaded seat opposite a static seat, wherein the live loaded dynamic or floating seat would function to adjust to changing pressures and other induced conditions. Moreover, it is contemplated that either upper or lower seat assemblies 228 and 232 of the present invention ball-type de-header valve 200 may each comprise a live loaded floating or dynamic seat. It will be obvious to one skilled in the art that any combination of floating, static, or similar type seats may be utilized by the present invention. As such, the embodiment shown in the Figures is not meant to be limiting in any way.

In the preferred embodiment, static seats 236 and 238 are securely fastened or coupled to de-header valve 200 and are disposed within seat retainers 240 and 242, respectively. Static seats 236 and 238 may or may not be adjustable depending upon design and intended use considerations. In the event one embodiment calls for a live loaded dynamic or floating seat, this seat will preferably be a moveable and adjustable seat that is energized from without the process stream via a live seat adjustment mechanism. The function of the dynamic, live loaded seat is to provide point to point fine tuning of the system, and particularly the valve closure as it is sealed between upper and lower seats 236 and 238. Various sealing members, such as O-rings, may be used to seal the seats and their adjacent seat retainers to de-header valve 200.

In another exemplary embodiment, means for supporting valve closure 220 comprises a support system provided by main body 204, without requiring some type of a seat support system. In this particular embodiment, main body 204 will comprise some type of surface adapted or made to contact valve closure 220 in a similar manner as the seat support system described above, wherein main body 204 will be capable of functioning in a similar manner to provide support of valve closure 220 and to create a continuous contact seal therebetween.

It is important to note that in each of the embodiments discussed above for ball-type de-header valve 200, it is preferable that a continuous contact seal be created between valve closure 220 and means for supporting valve closure 220, just as described and explained above.

FIGS. 5-A-5-C illustrate various views of an adjusting wedge gate-type de-header valve 300 according to one exemplary embodiment of the present invention. In this embodiments adjusting wedge gate-type de-header valve 300 comprises a main body 304 connected to a bonnet 368. Main body 304 comprises a first flanged portion 308 having an opening or port 310 that removably couples to a complimentary opening of a coke drum (not shown) via connection means, such as bolt connection 316. Main body 304 further comprises a second flanged portion 312 having an opening or port 314. First and second flanged portions 308 and 312 are aligned with one another and are positioned opposite one another about main body 304 in a complimentary manner.

Adjusting wedge gate-type de-header valve 300 further comprises a valve closure 320 in the form of an adjustable wedge having an upper gate 321 and a lower gate 322 adjustably coupled to adjustors 364 and 368, respectively. Adjustors 364 and 368 are further coupled to carriage 360 and function to provide the means for adjusting both upper and lower gates 321 and 322 as needed during oscillation of valve closure 320. Carriage 360 is further coupled to clevis 356, which is in turn coupled to driveshaft 352. Driveshaft 352 is operably connected to actuator means housed within cylinder 384 and functions to transition valve closure 320 between an open and closed position. Actuator means is preferably a hydraulically controlled power source capable of moving valve closure 320 through its linear, bi-directional cycle during a coking process, and specifically for the purpose of de-heading and re-heading the coke drum. In a closed position, valve closure 320 seals off the opening of the coke drum so that the drum may be filled with the petroleum byproduct used to manufacture coke. Once the drum is full, the valve closure is actuated. The contact seal created between the surface of valve closure 320 and means for supporting the valve closure is such that any accumulated coke on upper gate 321 is sheared off, thus effectively de-heading the coke drum. Continued actuation causes valve closure 330 to relocate to a fully open position. In its fully open position, valve closure 320 is retracted into chamber 372, thus providing a clear flow path for the materials contained within the coke drum.

As shown, adjusting wedge gate-type de-header valve 300 further comprises means for supporting valve closure 320 in the form of a seat support system 324. Seat support system 324 comprises an upper seat 328 supported by an upper seat retainer 340 for providing support to upper gate 321; and lower seat 332 supported by a lower seat retainer 342 for providing support to lower gate 322. In the embodiment shown, upper and lower seats 328 and 332 are both static seats set at a pre-determined slope. As stated, valve closure 320 oscillates between an open and closed position for de-heading and re-heading a coke drum. In an opened position, valve closure 320 is positioned within chamber 372. As valve closure 320 is actuated, and as it approaches a closed position, the contact of upper and lower gate assemblies 321 and 322 with seats 328 and 332, respectively, increases until valve closure 320 is in its fully closed position. At this time, each of adjustors 364 and 368 actuate to cause upper and lower gates 321 and 322 to properly engage upper and lower seats 328 and 332 and to seal against upper and lower seats 328 and 332 as intended. By actuating drive shaft 352, valve closure 320 is forced into the wedge-shaped orientation of seat support system 324. However, too much force may cause or induce an undue amount of force on the portion of upper and lower seats 328 and 332 distal drive shaft 352. As such, adjustors 364 and 368 function to balance out or evenly distribute the force exerted upon upper and lower seats 328 and 332 by upper and lower gates 321 and 322, thus creating a proper and even contact seal therebetween. In turn, as valve closure 320 is again actuated to transition from its closed position to an open or partially opened position, the contact seal created shears or breaks any accumulated coke, thus effectively de-heading the coke drum. This contact seal is continuously maintained throughout each oscillation of valve closure 320 as ensured by adjustors 364 and 368.

Seat support system 324 may comprise other configurations, such as dual dynamic or live loaded seats, a combination of a static and dynamic seat, or a single supporting seat that is either static or dynamic. In the case of a live loaded or dynamic seat, the seat and its resultant force may be adjusted accordingly to provide a proper contact seal, and to maintain this seal throughout the oscillations of valve closure 320. Still, means for supporting valve closure 320 may comprise no seats, but instead some other type of support system, such as segments of the main body 304 itself, modified to support upper and lower gates and to provide a proper contact seal between the two.

Adjusting wedge gate-type de-header valve 300 further comprises steam purge port 376, a lockout assembly 386, and cooling box 390 as additional features, each of which are explained in the incorporated applications identified above.

FIGS. 6-A-6-C illustrate various views of a flexible wedge gate-type de-header valve 400, according to one exemplary embodiment of the present invention. In the embodiment shown, flexible wedge gate-type de-header valve 400 comprises a main body 404 connected to a bonnet 468. Main body 404 comprises a first flanged portion 408 having an opening or port 410 that removably couples to a complimentary opening of a coke drum (not shown) via connection means, such as bolt connection 416. Main body 404 further comprises a second flanged portion 412 having an opening or port 414. First and second flanged portions 408 and 412 are aligned with one another and are positioned opposite one another about main body 404 in a complimentary manner.

Flexible wedge gate-type de-header valve 400 further comprises a valve closure 420 in the form of a flexing wedge gate comprising an upper gate 421 and a lower gate 422 that each flex upon contact with and insertion into upper and lower seats 428 and 432 as valve closure 420 transitions from an open or partially open position to a closed position. Valve closure 420 is further coupled to clevis 456, which is turn coupled to drive shaft 452. Drive shaft 452 is further coupled to actuating means that functions to power drive shaft 452 and cause valve closure 420 to oscillate between an open and closed position. Actuator means is preferably a hydraulically controlled power source capable of moving valve closure 420 through its linear, bi-directional cycle during a coking process, and specifically for the purpose of de-heading and re-heading the coke drum. In a closed position, valve closure 420 seals off the opening of the coke drum so that the drum may be filled with the petroleum byproduct used to manufacture coke. Once the drum is full, valve closure 420 is actuated. The contact seal created between the surface of valve closure 420 and means for supporting the valve closure (e.g., seat support system) is such that any accumulated coke on upper gate 421 is sheared off, thus effectively de-heading the coke drum. Continued actuation causes valve closure 430 to relocate to a fully open position. In its fully open position, valve closure 420 is retracted into chamber 472, thus providing a clear flow path for the materials contained within the coke drum.

As shown, flexible wedge gate-type de-header valve 400 further comprises means for supporting valve closure 420 in the form of a seat support system 424. Seat support system 424 comprises an upper seat 428 supported by an upper seat retainer 440 for providing support to upper gate 421; and lower seat 432 supported by a lower seat retainer 442 for providing support to lower gate 422. In the embodiment shown, upper and lower seats 428 and 432 are both static seats set at a pre-determined slope. As stated, valve closure 420 oscillates between an open and closed position for de-heading and re-heading a coke drum. In an opened position, valve closure 420 is positioned within chamber 472. As valve closure 420 is actuated, and as it approaches a closed position, the contact of upper and lower gate assemblies 421 and 422 with seats 428 and 432, respectively, increases until valve closure 420 is in its fully closed position. As it is closing and making more contact with upper and lower seats 428 and 432, upper and lower gates 421 and 422 each flex to conform to the slope each of seats 428 and 432 are positioned. Indeed, seats 428 and 432 may be set at the same slope, or they may comprise different slopes, or one may comprise a slope with the other comprising no relative slope. Nonetheless, each of upper and lower gates 421 and 422 properly engage upper and lower seats 428 and 432 and seal against these as intended. By actuating drive shaft 452, valve closure 420 is forced into the wedge-shaped orientation created by seat support system 324.

Seat support system 424 may comprise other configurations, such as dual dynamic or live loaded seats, a combination of a static and dynamic seat, or a single supporting seat that is either static or dynamic. In the case of a live loaded or dynamic seat, the seat and its resultant force may be adjusted accordingly to provide a proper contact seal, and to maintain this seal throughout the oscillations of valve closure 420. Still, means for supporting valve closure 420 may comprise no seats, but instead some other type of support system, such as segments of the main body 404 itself, modified to support upper and lower gates and to provide a proper contact seal between the two.

Flexible wedge gate-type de-header valve 400 further comprises steam purge port 476, a lockout assembly 486, and cooling box 490 as additional features, each of which are explained in the incorporated applications identified above.

FIGS. 7-A-7-C illustrate various views of a parallel slide gate-type de-header valve 500, according to one exemplary embodiment of the present invention. This parallel slide gate-type de-header valve functions similar to the ones described above. In the embodiment shown, parallel slide gate-type de-header valve 500 comprises a main body 504 connected to a bonnet 568. Main body 504 comprises a first flanged portion 508 having an opening or port 510 that removably couples to a complimentary opening of a coke drum (not shown) via connection means, such as bolt connection 516. Main body 504 further comprises a second flanged portion 512 having an opening or port 514. First and second flanged portions 508 and 512 are aligned with one another and are positioned opposite one another about main body 504 in a complimentary manner.

Parallel slide gate-type de-header valve 500 further comprises a valve closure 520 having an upper gate 521 and a lower gate 522 situated between means for supporting the valve closure, in this case seat support system 524. Upper gate 521 and lower gate 522 are each supported in a biased nature against seat support system 524, thus making valve closure 520 a spring loaded valve closure. Biasing means, namely springs 564, 566, and 568, are provided to cause upper and lower gates 521 and 522 to push against upper and lower seats 528 and 532, respectively, and to create a contact seal therebetween. Internal pressure forces upper and lower gates 521 and 522 against their respective seats to create the contact seal. Biasing means may comprise various pre-determined stiffness characteristics depending upon the intended use for parallel slide gate-type de-header valve 500. Moreover, any number and/or configuration of biasing means may be used as will be apparent to one skilled in the art.

Valve closure 520 is further coupled to carriage 560, which is in turn coupled to clevis 556, which is turn coupled to drive shaft 552. Drive shaft 552 is further coupled to actuating means that functions to power drive shaft 552 and cause valve closure 520 to oscillate between an open and closed position. Actuator means is preferably a hydraulically controlled power source capable of moving valve closure 520 through its linear, bi-directional cycle during a coking process, and specifically for the purpose of de-heading and re-heading the coke drum. In a closed position, valve closure 520 seals off the opening of the coke drum so that the drum may be filled with the petroleum byproduct used to manufacture coke. Once the drum is full, valve closure 520 is actuated. The contact seal created between the surface of valve closure 520 and means for supporting the valve closure (e.g., seat support system) is such that any accumulated coke on upper gate 521 is sheared off, thus effectively de-heading the coke drum. Continued actuation causes valve closure 530 to relocate to a fully open position. In its fully open position, valve closure 520 is retracted into chamber 572, thus providing a clear flow path for the materials contained within the coke drum and for decoking the coke drum.

As in other de-header valves discussed herein, means for supporting valve closure 520 may be any means described above. In the embodiment shown, seat support system 524 functions as the supporting means. Seat support system 524 comprises upper and lower seats 528 and 532, each static and contained within seat retainers 540 and 542. Other embodiments include dual floating or dynamic seats, or a combination of one static and one dynamic seat, or a single seat of a static or dynamic nature, or a configuration requiring no seats.

Parallel slide gate-type de-header valve 500 further comprises steam purge port 576, a lockout assembly 586, and cooling box 590 as additional features, each of which are explained in the incorporated applications identified above.

FIGS. 8-A-8-C illustrate various views of a solid wedge gate-type de-header valve 600, according to one exemplary embodiment of the present invention. This de-header valve is also similar in function to the gate-type valves described above. However, solid wedge gate-type de-header valve 600 comprises a single wedge shaped valve closure 620 supported by means for supporting the valve closure, in this case seat support system 624. Solid wedge gate-type de-header valve 600 also comprises a main body 604 connected to a bonnet 668. Main body 604 comprises a first flanged portion 608 having an opening or port 610 that removably couples to a complimentary opening of a coke drum (not shown) via connection means, such as bolt connection 616. Main body 604 further comprises a second flanged portion 612 having an opening or port 614. First and second flanged portions 608 and 612 are aligned with one another and are positioned opposite one another about main body 604 in a complimentary manner.

Valve closure 620, although shown comprising a dual slant wedge shape, may comprise other wedge shapes, such as a single slant wedge shape with a flat top or bottom. Each shape would dictate the orientation of means for supporting the valve closure. In the exemplary embodiment shown, valve closure 620 comprises a dual slant wedge shape. Upper and lower seats 628 and 632 function to support valve closure 620, and are set at a slope similar to the ones existing on valve closure 620. Upper and lower seats are preferably live loaded floating or dynamic seats having a predetermined bias so as to be able to automatically adjust and optimize the contact seal created between the surfaces of valve closure 620 and each of upper and lower seats 628 and 632, respectively. The contact between upper and lower seats 628 and 632 provides a contact seal, preferably a metal to metal contact seal, during the coke manufacturing process.

Valve closure 620 is further coupled to clevis 656, which is in turn coupled to drive shaft 652. Drive shaft 652 is further coupled to actuating means that functions to power drive shaft 652 and cause valve closure 620 to oscillate between an open and closed position. Actuator means is preferably a hydraulically controlled power source capable of moving valve closure 620 through its linear, bi-directional cycle during a coking process, and specifically for the purpose of de-heading and re-heading the coke drum. In a closed position, valve closure 620 seals off the opening of the coke drum so that the drum may be filled with the petroleum byproduct used to manufacture coke. Once the drum is full, valve closure 620 is actuated. The contact seal created between the surface of valve closure 620 and means for supporting the valve closure (e.g., seat support system) is such that any accumulated coke on upper gate 621 is sheared off, thus effectively de-heading the coke drum. Continued actuation causes valve closure 630 to relocate to a fully open position. In its fully open position, valve closure 620 is retracted into chamber 672, thus providing a clear flow path for the materials contained within the coke drum.

Solid wedge gate-type de-header valve 600 further comprises steam purge port 676, a lockout assembly 686, and cooling box 690 as additional features, each of which are explained in the incorporated applications identified above.

Figure 9A:
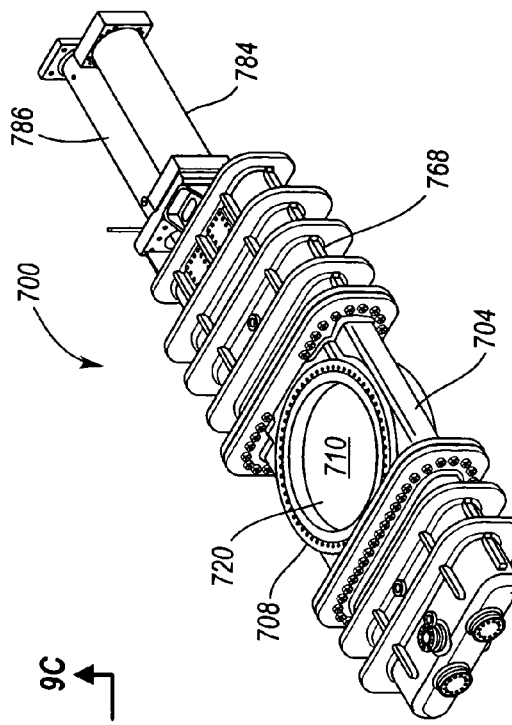
FIG. 9-A illustrates a perspective view of a sliding blind gate-type de-header valve according to one exemplary embodiment of the present invention.
Figure 9B:
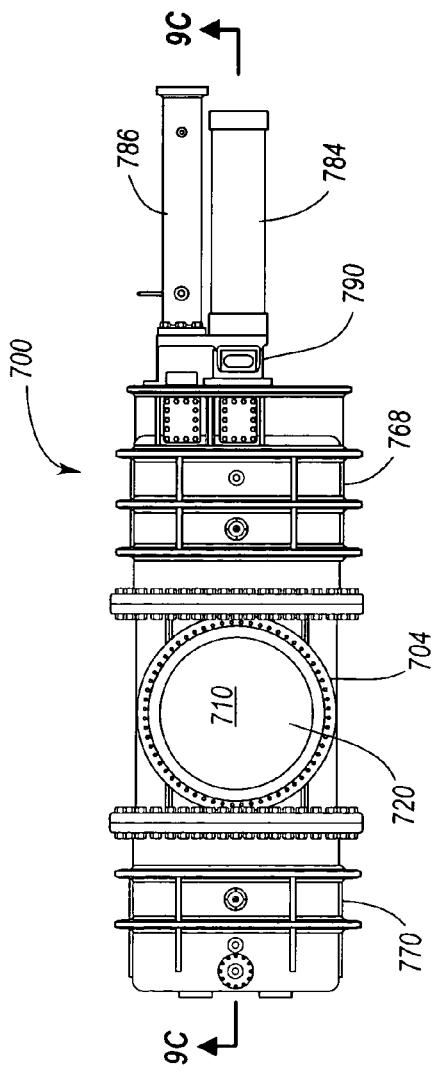
Figure 9C:
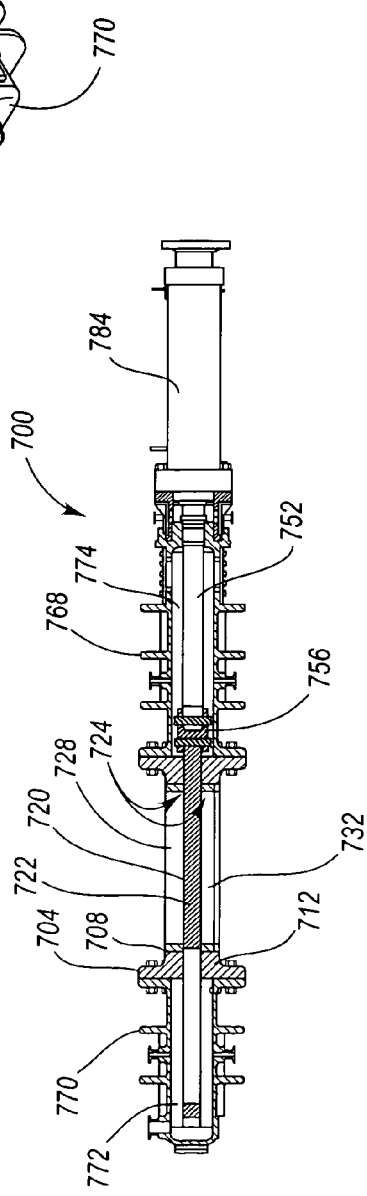

FIGS. 9-A-9-C illustrate various views of a sliding blind gate-type de-header valve 700, according to one exemplary embodiment of the present invention. Sliding blind gate-type de-header valve 700 comprises a main body 704 removably coupled to upper and lower bonnets 768 and 770, each comprising upper and lower chambers 772 and 774, respectively. Main body 704 comprises a first flange portion 708 having an opening or port 710 therein, and a second flange portion 712 having an opening or port 714 therein. Main body 704 removably couples to a complimentary flange portion and associated opening or port of a coke drum, such that each opening is concentric and/or aligned with one another.

Sliding blind gate-type de-header valve 700 further comprises a valve closure in the form of a sliding blind or gate 720 having an aperture therein that is capable of aligning with openings 710 and 714 in an open position. Valve closure 720 slides back and forth in a linear, bi-directional manner between means for supporting a valve closure, shown in this exemplary embodiment as seat support system 724. Seat support system 724 may comprise any type of seating arrangement, including dual, independent seats, wherein the seats are both static, both floating or dynamic, or a combination of these. Seat support system 724 may alternatively comprise a single seat in support of valve closure 720, wherein the seat may comprise a static or floating or dynamic seat. In another exemplary embodiment, means for supporting a valve closure may dispense with a seating system in favor of a support system built into main body 704, such that one or more portions or components of main body 704 are selected and prepared to support valve closure 720. In any event, means for supporting a valve closure preferably comprises a metal contact surface that contacts and seals with a metal surface on valve closure 720, wherein this contact seal is maintained during the coke manufacturing process.

Valve closure 720 is coupled to clevis 756, which is turn coupled to drive shaft 752. Drive shaft 752 is further coupled to actuating means that functions to power drive shaft 752 and cause valve closure 720 to oscillate between an open and closed position. Actuator means is preferably a hydraulically controlled power source contained within cylinder 784 and that is capable of moving valve closure 720 through its linear, bi-directional cycle during a coking process, and specifically for the purpose of de-heading and re-heading the coke drum. In a closed position, valve closure 720 seals off the opening of the coke drum so that the drum may be filled with the petroleum byproduct used to manufacture coke. Portions of gate 722 extend into upper chamber 772 in the closed position to allow the solid part of gate 722 to cover and close off the opening in the de-header valve and the coke drum. Once the drum is full, valve closure 720 is actuated. The contact seal created between the surface of valve closure 720 and means for supporting the valve closure (e.g., seat support system) is such that any accumulated coke on gate 722 is sheared off, thus effectively de-heading the coke drum. Continued actuation causes valve closure 730 to relocate to a fully open position. In its fully open position, valve closure 720 is retracted into chamber 772, thus providing a clear flow path for the materials contained within the coke drum.

Sliding blind gate-type de-header valve 700 further comprises steam purge port 776, a lockout assembly 786, and cooling box 790 as additional features, each of which are explained in the incorporated applications identified above.

Figure 10:
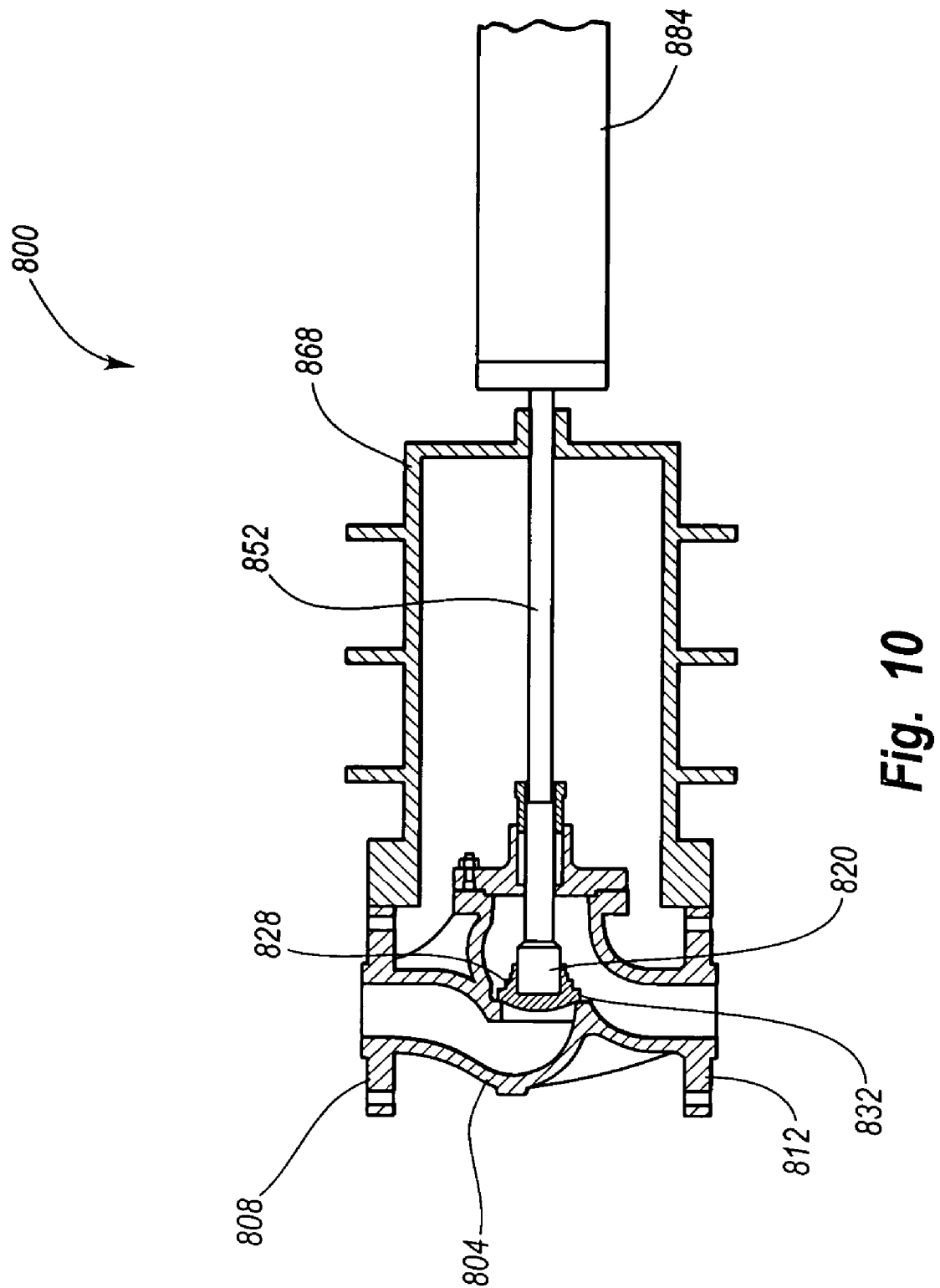
FIG. 10 illustrates a globe-type de-header valve according to one exemplary embodiment of the present invention.

FIG. 10 illustrates an exemplary globe-type de-header valve 800, according to an exemplary embodiment of the present invention. The globe-type de-header valve 800 is a linear motion valve with rounded main body 804 that removably couples to a coke drum (not shown). Main body further comprises a first flanged portion 808 having an opening 810 therein; and a second flanged portion 812, also having an opening 814 therein. Openings 810 and 814 align with a complimentary opening or port on a coke drum.

Globe-type de-header valve further comprises a valve closure in the form of a disk 820, which functions to, among other things, regulate flow through globe-type de-header valve 800. Disk 820 is coupled to drive shaft 852, which is further coupled to actuating means that functions to power drive shaft 852 and cause disk 820 to oscillate between an open and closed position. Actuator means is preferably a hydraulically controlled power source capable of moving disk 820 through its linear, bi-directional cycle during a coking process, and specifically for the purpose of de-heading and re-heading the coke drum. In a closed position, disk 820 seals off the opening of the coke drum so that the drum may be filled with the petroleum byproduct used to manufacture coke. Once the drum is full, disk 820 is actuated. The contact seal created between the surface of disk 820 and means for supporting the valve closure (e.g., seat support system) is such that any accumulated coke on the surface of disk 820 is sheared off, thus effectively de-heading the coke drum. Continued actuation causes disk 820 to relocate to a fully open position. In its fully open position, disk 820 is retracted into chamber 872, thus providing a clear flow path for the materials contained within the coke drum.

As shown, globe-type de-header valve 800 further comprises means for supporting the disk in the form of a seat support system 824. Seat support system 824 comprises an upper seat 828 supported by an upper seat retainer 840 for providing support to an upper surface 821 of disk 820; and lower seat 832 supported by a lower seat retainer 842 for providing support to a lower surface 822 of disk 820. In the embodiment shown, upper and lower seats 828 and 832 are both static seats. As stated, valve closure 820 oscillates between an open and closed position for de-heading and re-heading a coke drum.

Figure 11:
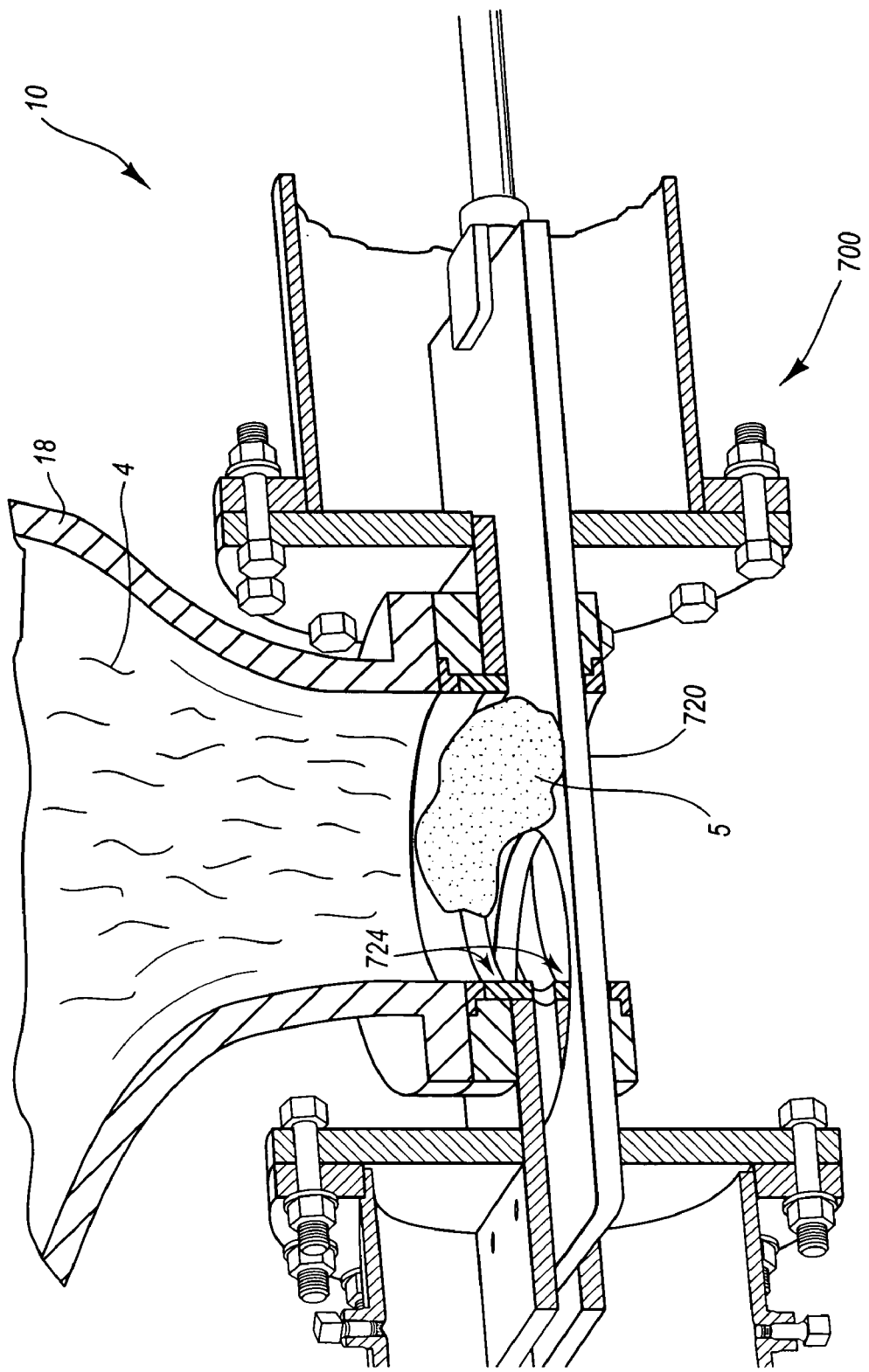
FIG. 11 illustrates a de-header valve in operation as attached to a coke drum.
Figure 12:
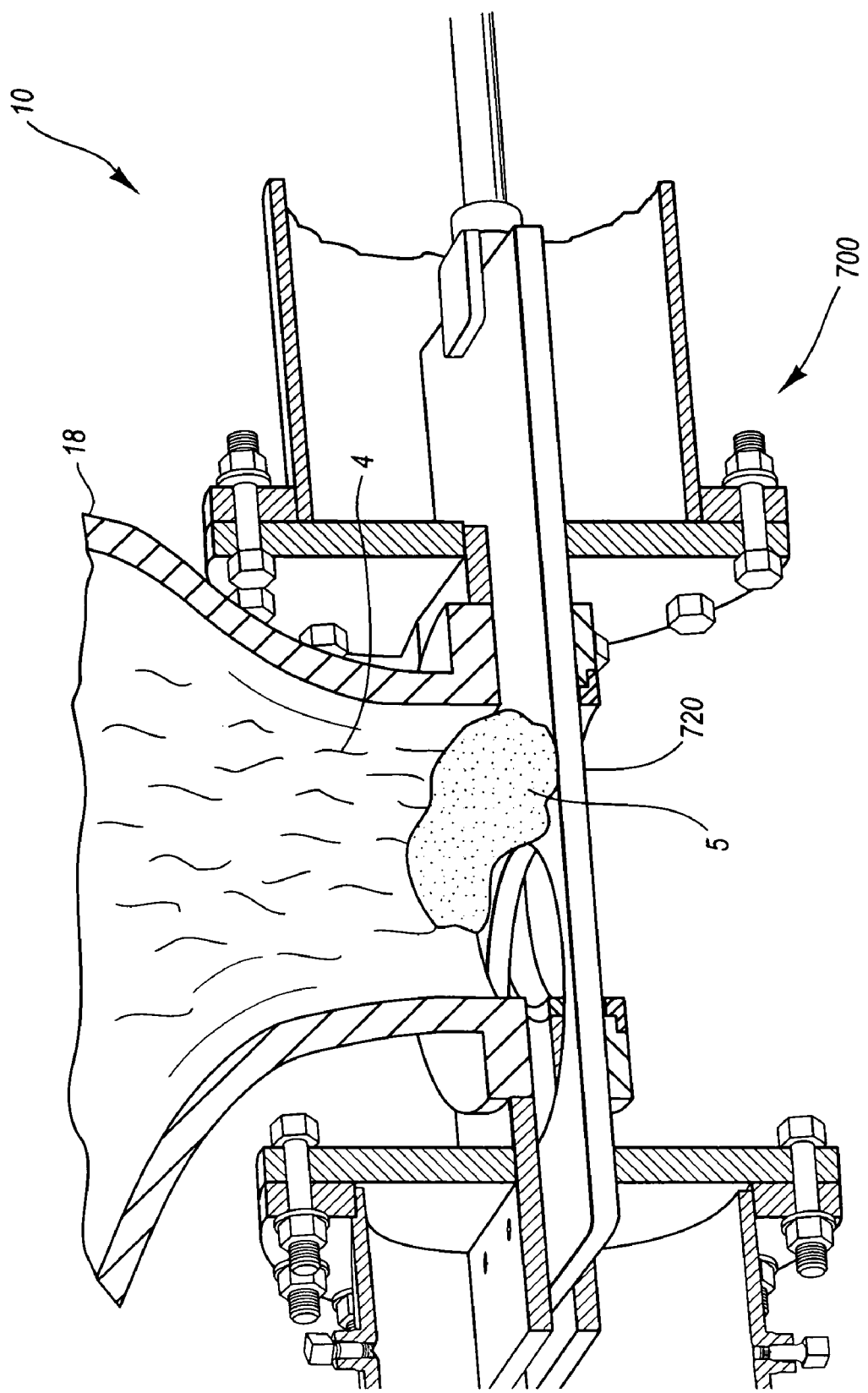
FIG. 12 illustrates a de-header valve in operation as attached to a coke drum.

FIG. 11 illustrates an exemplary operating arrangement in which one of the above-described de-header valves is in use in a delayed coking process. Specifically, FIG. 11 illustrates a coke drum de-heading system 10 showing sliding blind gate-type valve 700 in operation as removably coupled to coke drum 18. FIG. 11 depicts sliding blind gate-type valve 700 with valve closure 720 in a partially open position, thus in the process of de-heading coke drum 18. As can be seen, an accumulated coke head 5 exists at the surface of valve closure 720, wherein it has been sheared by the contact seal existing between valve closure 720 and seat support system 724. By shearing coke head 5, coke drum 18 is essentially de-headed and prepared for the decoking process in which the coke 4 within coke drum 18 is purged down through the openings in de-header valve 700 and into a container. Although a sliding blind gate-type de-header valve is depicted in FIG. 11, it is emphasized that any of the various types of de-header valves discussed above and illustrated in the Figures herein may be utilized within the coke manufacturing process and to perform the de-heading function of coke drum.

The present invention also features a method for de-heading a coke drum following the manufacture of coke therein. The method comprises the steps of: (a) obtaining at least one coke drum designed for the manufacture of coke, wherein the coke drum comprises at least one purge port; (b) equipping the coke drum with a de-header valve, the de-header valve being removably coupled to the coke drum and itself comprising (1) a main body having an orifice dimensioned to align with said port of said coke drum when said de-header valve is coupled thereto; (2) a valve closure operably supported by said main body, said valve closure capable of being actuated to oscillate between an open and closed position with respect to said orifice and said port; (3) means for supporting said valve closure; (c) closing the valve closure, thus providing a contact seal between the valve closure and the means for supporting a valve closure; (d) feeding petroleum byproduct into the coke drum via a coke manufacturing process; and (e) de-heading the coke drum by actuating the valve closure and causing it to move about the means for supporting a valve closure into an open position, the means for supporting a valve closure shearing the coke in the coke drum as the blind is displaced and thus effectively de-heading the coke drum. The de-header valve may comprise any of the different valve-types discussed above. In addition, means for supporting a valve closure may comprise any means discussed above and others obvious to one skilled in the art. This method may further be utilized on either a bottom or top de-heading system.

The present invention may be embodied in other specific forms without departing from its spirit of essential characteristics. The described embodiments are to be considered in all respects only al illustrative and not restrictive. The scope of the invention is, therefore, indicated by the appended claims, rather than by the foregoing description. All changes which come within the meaning and range of equivalency of the claims are to be embraced within their scope

What is claimed and desired to be secured by Letters Patent is:

1. A coke drum de-header system comprising:
(a) a de-header valve coupled to a coke drum, said de-header valve comprising:
(1) a main body having an orifice dimensioned to align with a port of said coke drum when said de-header valve is coupled thereto;
(2) a valve closure operably supported by said main body, said valve closure capable of being actuated to oscillate between an open and closed position with respect to said orifice and said port;
(b) a continuously maintained metal to metal contact seal between said valve closure and a means for supporting said valve closure; and
(c) a means for actuating said valve closure.

2. The coke drum dc-header system of claim 1, wherein said means for supporting said valve closure comprises a seat support system.

3. The coke drum de-header system of claim 2, wherein said seat support system comprises dual, independent seats positioned opposite one another on either side of said valve closure, that are structured to apply opposing forces upon said valve closure, and wherein said seats are selected from one of a static seat and a dynamic seat.

4. The coke drum dc-header system of claim 2, wherein said seat support system comprises at least one live loaded seat and seat assembly.

5. The coke drum de-header system of claim 2, wherein said seat support system comprises at least one static seat and seat assembly.

6. The coke drum dc-header system of claim 2, wherein said seat support system comprises a static seat positioned opposite a complimentary live loaded seat.

7. The coke drum dc-header system of claim 1, wherein said de-header valve is selected from the group consisting of a plug valve, a ball or globe valve, a flexible wedge gate valve, a parallel slide gate valve, a solid wedge gate valve, and a sliding blind gate valve.

8. The coke drum de-header system of claim 1, wherein said means for supporting said valve closure comprises portions of said main body adapted to support said valve closure and provide said contact seal.

9. The coke drum de-header system of claim 1, further comprising at least one bonnet coupled to said main body, wherein said at least one bonnet comprises a steam purge system for releasing excess pressure from said at least one bonnet.

10. The coke drum de-header system of claim 1, further comprising an internal material isolation and containment system, effectively surrounded by at least one bonnet, wherein said bonnet is coupled to said main body.

11. The coke drum de-header system of claim 1, wherein said means for supporting said valve closure comprises portions of the de-header system and the coke drum.

12. The coke drum de-header system of claim 11, wherein the means for supporting said valve closure comprises a first seat and a second seat, wherein said first seat is comprised of a flange of the coke drum, and wherein said second seat is comprised of an element selected from a group consisting of: a portion of said main body of said de-header system, and a seat support system, wherein said support system comprises a seat selected from a group consisting of a static seat and a dynamic seat.

* * * * *